United States Patent
Konno

(10) Patent No.: US 9,740,300 B2
(45) Date of Patent: Aug. 22, 2017

(54) INFORMATION PROCESSING SYSTEM, MANAGEMENT APPARATUS, AND MANAGEMENT METHOD

(71) Applicant: FUJITSU LIMITED, Kawasaki-shi, Kanagawa (JP)

(72) Inventor: Takahiro Konno, Sagamihara (JP)

(73) Assignee: FUJITSU LIMITED, Kawasaki (JP)

( * ) Notice: Subject to any disclaimer, the term of this patent is extended or adjusted under 35 U.S.C. 154(b) by 313 days.

(21) Appl. No.: 14/477,235

(22) Filed: Sep. 4, 2014

(65) Prior Publication Data

US 2015/0121056 A1 Apr. 30, 2015

(30) Foreign Application Priority Data

Oct. 31, 2013 (JP) .................................. 2013-226947

(51) Int. Cl.
G06F 3/02 (2006.01)
G06F 3/023 (2006.01)
(52) U.S. Cl.
CPC ............ G06F 3/023 (2013.01); G06F 3/0227 (2013.01)
(58) Field of Classification Search
CPC ................................ G06F 3/023; G06F 3/0227
See application file for complete search history.

(56) References Cited

U.S. PATENT DOCUMENTS 5,448,732 A * 9/1995 Matsumoto ........... G06F 15/167
713/375
2006/0095644 A1 5/2006 Fujita et al.
2006/0176293 A1 8/2006 Hoshino
2011/0251992 A1* 10/2011 Bethlehem .......... H04L 12/2863
707/610
2015/0019252 A1* 1/2015 Dawson ................... A61C 8/00
705/3

FOREIGN PATENT DOCUMENTS

JP 2006-127252 5/2006
JP 2006-221292 A 8/2006
JP 2012-230709 11/2012

OTHER PUBLICATIONS

Japanese Office Action mailed Mar. 7, 2017 for corresponding Japanese Patent Application No. 2013-226947, with Partial English Translation, 7 pages.

* cited by examiner

*Primary Examiner* — Chun-Kuan Lee
*Assistant Examiner* — Ronald Modo
(74) *Attorney, Agent, or Firm* — Fujitsu Patent Center

(57) ABSTRACT

By causing information processing apparatuses belonging to a same group to be in a same state and transmitting operation information received from an input unit to the information processing apparatuses belonging to the same group simultaneously or approximately simultaneously, the operations of the information processing apparatuses belonging to the same group are synchronized with each other, and operation results received from the synchronized information processing apparatuses belonging to the same group are output by an output unit. In this way, the plurality of grouped information processing apparatuses can be simultaneously operated.

18 Claims, 17 Drawing Sheets

FIG. 2

16a: SIMULTANEOUS OPERATION TARGET SERVER GROUP INFORMATION TABLE 16a-1:

| GROUP ID | GROUP NAME | TARGET SERVER PORT NUMBER |
|---|---|---|
| A | Server Model A | 1,2,11,12,18 |
| B | Server Model B | 5,6,30,32 |
| C | RAID Configuration | 8,9,21,22,31 |

16a-2:

| SERVER PORT NUMBER | SIMULTANEOUS OPERATION TARGET SERVER GROUP ID | INITIAL STATE COMPLETION INFORMATION |
|---|---|---|
| 1 | A | SUCCESS |
| 2 | A | SUCCESS |
| 3 | — | — |
| ... | | |
| 30 | B | SUCCESS |
| 31 | C | ERROR |
| 32 | B | — |

16b: OPERATION SEQUENCE INFORMATION TABLE FOR INITIAL STATE SYNCHRONIZATION

FOR GROUP A

| INITIAL STATE SYNCHRONIZATION SEQUENCE NUMBER | STANDBY TIME | CONTENT OF OPERATION |
|---|---|---|
| 1 | +3 SECONDS | PRESSING OF KB_"ESC" KEY |
| 2 | +30 SECONDS | PRESSING OF KB_"F2" KEY |

16c

| SIMULTANEOUS OPERATION FLAG |
|---|
| A,C |

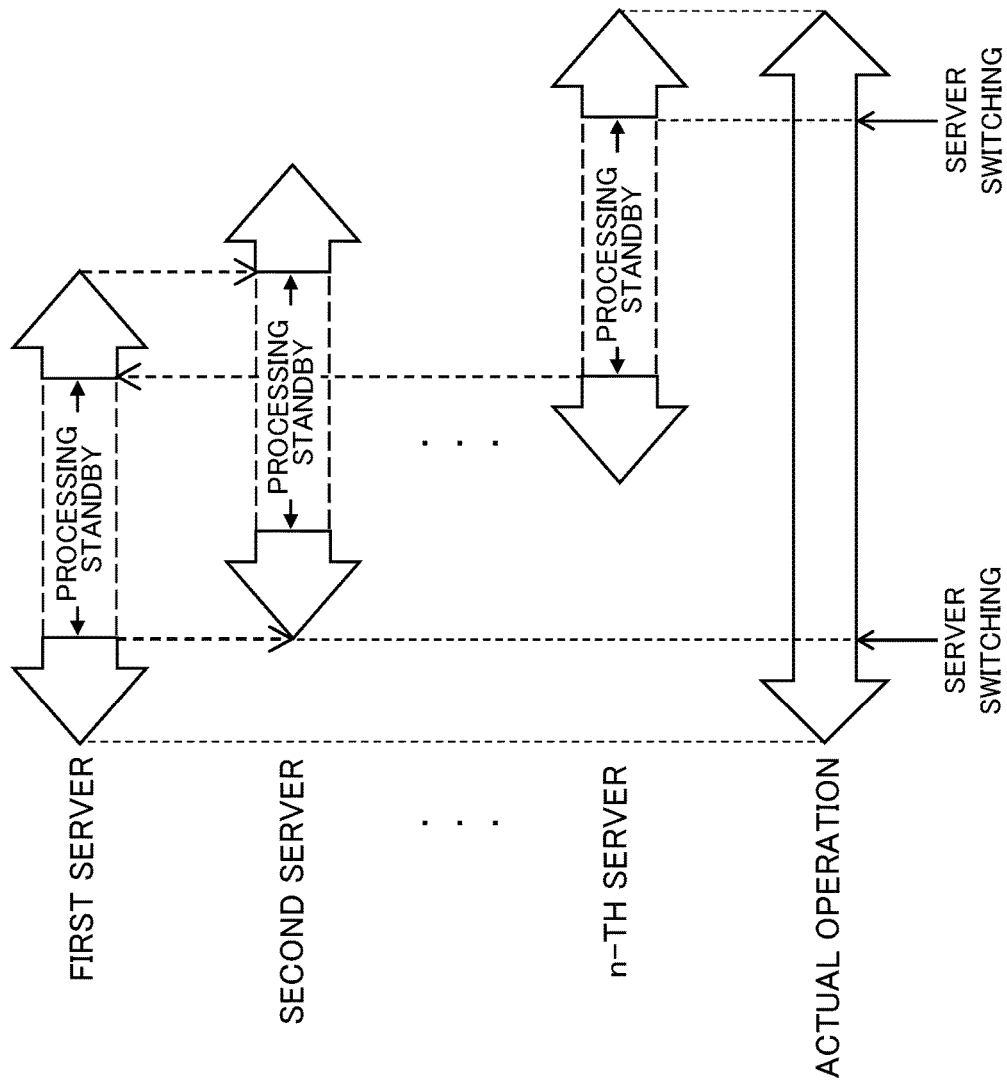

INFORMATION PROCESSING SYSTEM, MANAGEMENT APPARATUS, AND MANAGEMENT METHOD

CROSS-REFERENCE TO RELATED APPLICATION

This application is based upon and claims the benefit of priority of the prior Japanese Application No. 2013-226947 filed on Oct. 31, 2013 in Japan, the entire contents of which are hereby incorporated by reference.

FIELD

The present invention relates to an information processing system, a management apparatus, and a management method.

BACKGROUND

According to the wide use of network terminals such as personal computers (PCs), cellular phones, and smartphones, and personal digital assistances (PDA), the amount of data processed by a computer (server) providing various services increases, and an increase in the processing speed has been requested. Accordingly, not only by achieving the improvement of the performance of the server but also by using a plurality of servers, high speed, high reliability, and high operability of the entire processing system are realized. In order to realize a system using more servers, data centers have been built in which a plurality of racks each having a plurality of servers mounted thereon are installed together.

In such a data center, there are cases where several thousands of servers are managed per operator, and accordingly, it is desired to perform server management easily and efficiently. Thus, in the data center, a keyboard/video/mouse (KVM) switch that enables the operation of a plurality of servers using one set of console including a display, a keyboard (KB), and a mouse is used.

As KVM switches, there are an analog KVM switch that can be used only for a local connection and a digital KVM switch that can be used for managing servers also by a remote computer through a network, and any one thereof is used.

As an analog KVM switch that can perform universal serial bus (USB) emulation for a plurality of servers connected thereto, for example, a switch 100 as illustrated in FIG. 15 has been proposed (see JP 2006-127252 A). FIG. 15 is a block diagram that illustrates a general configuration example of an analog KVM switch 100 capable of USB emulation. As illustrated in FIG. 15, the analog KVM switch 100 is arranged between a local console 200 and a plurality of (32 in the figure) servers 300 and operates and manages the plurality of servers 300. The local console 200 includes a local monitor 210, a USB keyboard 220, and a USB mouse 230.

The analog KVM switch 100 includes: interface connectors 101; server ports 102; a micro processing unit (MPU) 110; a local keyboard/mouse control unit 120; video port control units 130; USB port control units 140; and an on-screen display (OSD) control unit 150.

Three interface connectors 101 are provided in the example illustrated in FIG. 15, and the local monitor 210, the USB keyboard 220, and the USB mouse 230 of the local console 200 are connected to each interface connector 101. Then, the local monitor 210 is connected to the MPU 110 and the OSD control unit 150 through the interface connector 101. In addition, the USB keyboard 220 and the USB mouse 230 are connected to the local keyboard/mouse control unit 120 through the interface connectors 101.

In the example illustrated in FIG. 15, 32 server ports 102 are provided, and each server port 102 is connected to the server 300. Each server 300 is connected to the video port control unit 130 and the USB port control unit 140 corresponding to each server 300 through the server port 102 corresponding thereto. Between each server 300 and each video port control unit 130, an analog video signal is exchanged through a video interface of the server port 102 corresponding thereto. In addition, between each server 300 and each USB port control unit 140, a USB signal is exchanged through the USB interface of the server port 102 corresponding thereto.

The MPU 110 is in charge of following various functions (a1) to (a4) of the analog KVM switch 100.

(a1) a function for transmitting an analog video signal transmitted from the video port control unit 130 of the server port 102 selected by the MPU 110 to the local monitor 210 so as to be output.

(a2) a function for transmitting data and a command of the server 300 side that are received by the USB port control unit 140 of the server port 102 selected by the MPU 110 to the local keyboard/mouse control unit 120.

(a3) a function for transmitting input data input from the USB keyboard 220 and the USB mouse 230 that is received by the local keyboard/mouse control unit 120 to the USB port control unit 140 of the server port 102 selected by the MPU 110.

(a4) a function for starting the OSD control unit 150 and transiting to the OSD mode when a specific key sequence (for example, Ctrl key+Ctrl key or Alt key+Alt key) used for performing setting, operating, state display, and the like of the KVM switch 100 is received.

The local keyboard/mouse control unit 120 performs emulation as the USB port of the server 300 and performs an enumeration process (device recognizing process) of the keyboard 220 and the mouse 230, a reception process of input data input from the keyboard 220 and the mouse 230, a command issuance process for issuing a command from the server 300, and the like.

The video port control unit 130 sets a video signal at one server port 102 selected by the MPU 110, which is transmitted from the server 300 side, to be in an enable state and sets video signals at the other server ports 102, which are transmitted from the server 300 side, to be in a disable state. In addition, the video port control unit 130 emulates extended display identification data (EDID) information of a local monitor 210 for the server 300.

The USB port control unit 140 emulates the local console 200 as a USB device and performs a response of the enumeration process that is transmitted from the server 300, the reception process of a command transmitted from for the server 300, the process of transmitting input data to the server 300, and the like.

When the OSD control unit 150 is started by the MPU 110 and transits to the OSD mode, the OSD control unit 150 displays a user interface used for operating the KVM switch 100 on the local monitor 210. The setting of the KVM switch 100, display of the state, the selection of the server port 102, and the like are performed by using the user interface.

In the analog KVM switch 100 configured as described above, at normal time, as denoted by arrows A1 to A6 illustrated in FIG. 16, the server port 102 (server port #1 illustrated in FIG. 16) selected by the MPU 110 and the local port (interface connector) 101 are connected together through the MPU 110. In addition, at the server ports 102 (server ports #2 to #32 illustrated in FIG. 16) that have not been selected, as denoted by arrows A7 and A8 illustrated in FIG. 16, the emulation of the local port 101 is performed by the video port control unit 130 and the USB port control unit 140.

FIG. 16 is a diagram that illustrates the flows of video signals and input data of the analog KVM switch 100, which is illustrated in FIG. 15, at normal time. In FIG. 16, arrows A4 to A6 denote the flow of a video signal from the server 300 connected to the selected server port 102. In addition, arrows A1 to A3 denote the flow of input data input to the server 300 connected to the selected server port 102. Furthermore, arrow A7 denotes the flow of a video signal from the server 300 connected to the server port 102 that has not been selected to the video port control unit 130, and arrow A8 denotes the flow of data exchanged between the server 300 connected to the server port 102 that has not been selected and the USB port control unit 140.

When the analog KVM switch 100 configured as described above transits to the OSD mode, as denoted by arrow A9 illustrated in FIG. 17, an OSD menu screen is displayed on the local monitor 210 by the OSD control unit 150. At this time, input data input from the USB keyboard 220 and the USB mouse 230 is not transmitted to the USB port control unit 140 of the server port 102 that has been selected by the MPU 110. FIG. 17 is a diagram that illustrates the flow of video signals and input data when the analog KVM switch 100 illustrated in FIG. 15 transits to the OSD mode. In FIG. 17, arrow A9 denotes the flow of an OSD screen signal from the OSD control unit 150 to the local monitor 210.

In a case where the above-described analog KVM switch 100 is used, one server 300 selected from one local console 200 through the MPU 110 can be operated from the local console 200. However, the KVM switch 100 does not have any means for simultaneously transmitting input data input from the local console 200 (the USB keyboard 220 and the USB mouse 230) to a plurality of server ports 102 and thus is not able to simultaneously operate a plurality of servers 300.

In addition, generally, the states of the servers 300 connected to the KVM switch 100 are not synchronized with each other, and accordingly, even when the input data input from the local console 200 can be simultaneously transmitted to a plurality of servers 300, the same operation result (the same video signal or the like) is not able to be acquired. Accordingly, it is desired for the operator to select one server port 102 from among a plurality of server ports 102 and perform an operation of the server 300 one by one by using the local console 200 while checking the screen supplied from the server 300 connected to the selected server port 102.

Meanwhile, in an information processing system, while there is a scheme for automatically performing update of an operating system (OS), an application, a device driver, and the like installed to the server, such update is not able to be automatically performed in a server before the installation of the OS or the start-up of the OS.

Thus, a technology for enabling a customized operation according to a client request for a plurality of apparatuses to be performed in a simultaneous and parallel manner even before the installation of an OS has been proposed as well (see JP 2012-230709 A). According to the technology, a script file in which key operation information is described in advance is analyzed, and the key operation information can be simultaneously delivered to a plurality of apparatuses connected to a delivery apparatus.

However, according to the technology, it is desired to describe the key operation information in the script file in advance, and a keyboard or a mouse is not able to be operated in real time while the screen is checked. In addition, only the same key operation can be transmitted to a plurality of apparatuses, but it is not able to be performed to group a plurality of apparatuses and deliver key operation information that is different for each group.

As described above, in the KVM switch 100 illustrated in FIG. 15, a plurality of servers 300 are not able to be simultaneously performed through one local console 200. Accordingly, even in a case where the same operation (for example, update of a basic input/output system (BIOS) or firmware (FW)) or an almost same operation (for example, the installation of an OS or an application) is performed for a plurality of servers 300, it is desired to select and switch one server 300 each time and then perform an operation for the server 300. Therefore, for example, even in a case where, during a processing standby time of a server 300, switching to another server 300 is made in accordance with a switching operation system illustrated in FIG. 18, and an operation for the another server 300 is performed, it takes an enormous amount of time to complete the operations for all the servers 300.

FIG. 18 is a diagram that illustrates an example of a switching operation system using the analog KVM switch 100 illustrated in FIG. 15. In the example illustrated in FIG. 18, when a first server is operated so as to perform a start-up process and is in a process standby state, thereafter, the same operation is sequentially performed for the second to the n-th servers. Then, when the same operation is performed for the n-th server, and the server is in the process standby state, the process is switched to the first server, and the process of ending the first server is performed. Thereafter, similarly, process of ending the second to n-th servers is sequentially performed.

In addition, as described above, according to the technology enabling the execution of a customization operation in a simultaneous and parallel manner, the key operation information needs to be described in a script file, and neither a keyboard operation nor a mouse operation can be performed in real time while the screen is checked. Accordingly, additional man-hour is required for preparing and verifying the script file, and, when the content of the key operation is changed, not only another script file needs to be prepared, but also another script file needs to be generated due to a slight change in the key operation timing. Furthermore, since it is not able to be performed to group a plurality of apparatuses and transmit key operation information that is different for each group, apparatuses having mutually-different contents of the key operation cannot be simultaneously connected, and, in order to change the content of the key operation, the script file and the apparatus need to be replaced.

SUMMARY

According to a scheme, there is provided an information processing system includes: a console including an input unit and an output unit; a plurality of information processing apparatuses grouped into a plurality of mutually-different groups; and a management apparatus configured to be interposed between the console and the plurality of information processing apparatuses and manage the plurality of information processing apparatuses. The management apparatus includes: an operation information reception unit; an operation information transmitting unit; and a synchronization control unit. The operation information reception unit is configured to receive operation information input from the input unit for information processing apparatuses belonging to a same group among the plurality of the information processing apparatuses. The operation information transmitting unit is configured to transmit the operation information received by the operation information reception unit to the information processing apparatuses belonging to the same group. The synchronization control unit is configured to synchronize operations of the information processing apparatuses belonging to the same group and cause the output unit to output operation results, which are received from the synchronized information processing apparatuses belonging to the same group, according to the operation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram that illustrates an example of a simultaneous operation target server group information table according to this embodiment;

FIG. 18 is a diagram that illustrates an example of a switching operation system using the analog KVM switch illustrated in FIG. 15.

DESCRIPTION OF EMBODIMENT(S)

Hereinafter, an information processing system 1 and an analog KVM switch 10 according to this embodiment will be described with reference to FIGS. 1 to 14.

[1] Configuration of Information Processing System and Analog KVM Switch According to this Embodiment First, the configuration of an information processing system 1 and an analog KVM switch 10 according to this embodiment will be described with reference to FIGS. 1 to 4.

Figure 1:
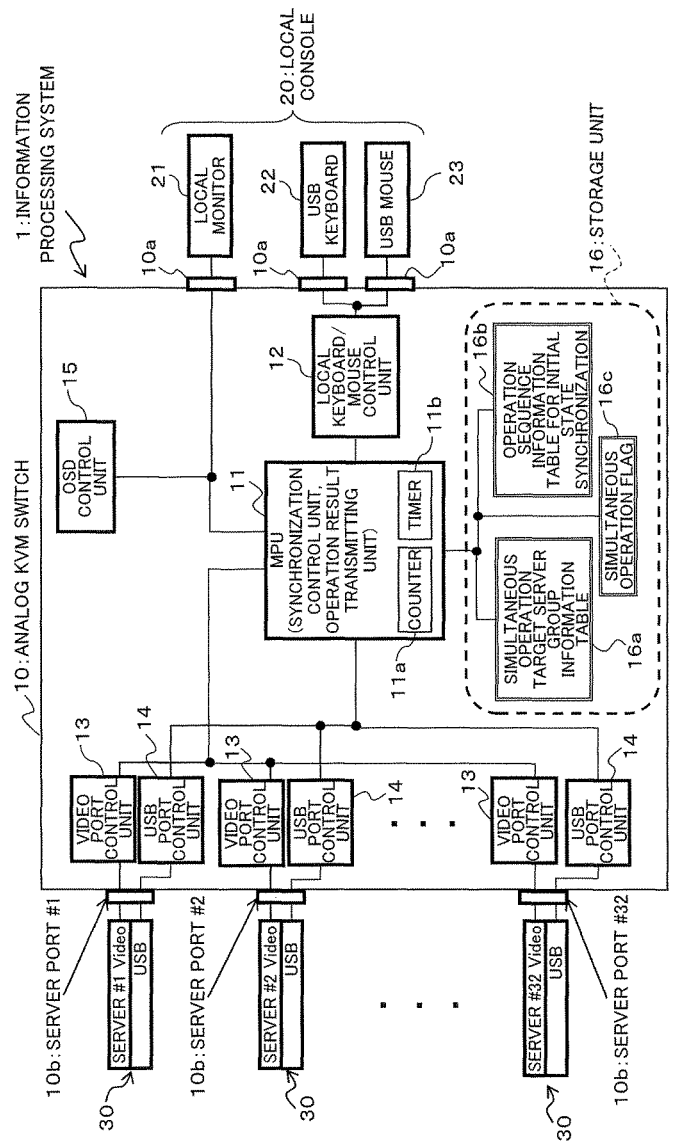
FIG. 1 is a block diagram that illustrates the hardware configuration and the functional configuration of an information processing system and an analog KVM switch (management apparatus) according to this embodiment.

FIG. 1 is a block diagram that illustrates the hardware configuration and the functional configuration of the information processing system 1 and the analog KVM switch 10 according to this embodiment. The information processing system 1 illustrated in FIG. 1 includes an analog KVM switch (management apparatus) 10, a local console 20, and a plurality of (32 in the figure) servers 30. Here, in a case where an arbitrary server is represented among the 32 servers, it will be represented as a "server 30", and, in a case where a specific server among the 32 servers is represented, it will be represented as "server #n". Here, n is an integer in the range of 1 to 32.

The local console (console) 20 includes a local monitor (output unit) 21, a USB keyboard (input unit) 22, and a USB mouse (input unit) 23.

The plurality of servers (information processing apparatuses) 30 are installed to a data center or the like and are grouped into a plurality of mutually-different groups. In addition, information relating to the grouping of the servers 30, in other words, information relating to servers 30 belonging to each same group is registered in a table 16a to be described later with reference to FIG. 2.

The analog KVM switch 10 is interposed between the local console 20 and the plurality of servers 30 and serves as a management apparatus that manages the plurality of servers 30. The analog KVM switch 10 includes: an interface connector 10a; a server port 10b, an MPU 11, a local keyboard/mouse control unit 12; a video port control unit 13; a USB port control unit 14; an OSD control unit 15; and a storage unit 16.

In the example illustrated in FIG. 1, three interface connectors (local ports) 10a are provided, and the interface connectors are respectively connected to the local monitor 21, the USB keyboard 22, and the USB mouse 23 of the local console 20. In addition, the local monitor 21 is connected to the MPU 11 and the OSD control unit 15 through the interface connector 10a. Furthermore, the USB keyboard 22 and the USB mouse 23 are connected to the local keyboard/mouse control unit 12 through the interface connectors 10a.

In the example illustrated in FIG. 1, 32 server ports 10b are provided and are respectively connected to the servers 30. Each server 30 is connected to the video port control unit 13 and the USB port control unit 14 corresponding to the server 30 through each server port 10b. Between each server 30 and each video port control unit 13, an analog video signal is exchanged through the video interface of each server port 10b. In addition, between each server 30 and each USB port control unit 14, a USB signal is exchanged through the USB interface of each server port 10b. Here, in a case where an arbitrary server port among the 32 server ports is represented, it will be represented as a "server port 10b", and, in a case where a specific server among the 32 servers is represented, it will be represented as "server port #n". Servers #1 to #32 are connected to server ports #1 to #32, respectively.

The local keyboard/mouse control unit 12 performs emulation as a USB port of the server 30 and performs an enumeration process (device recognizing process) of the keyboard 22 and the mouse 23, a reception process of input data input from the keyboard 22 and the mouse 23, a command issuance process for issuing a command from the server 30, and the like. The local keyboard/mouse control unit 12 performs the reception process of input data, thereby achieving the function of an operation information reception unit that receives operation information (input data) input from the keyboard 22 and the mouse 23 for the servers 30 belonging to the same group.

The video port control unit 13 and the USB port control unit 14 are provided for each of the 32 server ports 10b (32 servers 30).

The video port control unit 13 sets a video signal, which is transmitted from the server 30 side, at one server port 10b selected by the MPU 11 to be in the enable state and sets video signals, which are transmitted from the server 30 side, at the other server ports 10b to be in the disable state. In addition, the video port control unit 13 emulates the EDID information of the local monitor 21 for the server 30. Furthermore, the video port control unit 13 achieves the function of an operation result reception unit that receives an operation result according to the input data (operation information) from the synchronized servers 30 belonging to the same group.

The USB port control unit 14 emulates the local console 20 as a USB device and performs a response to the enumeration process that is transmitted from the server 30, the process of receiving command transmitted from the server 30, a transmission process of the input data for the server 30, and the like. The USB port control unit 14 performs the transmission process of the input data, thereby achieving the function of an operation information transmitting unit that transmits the input data received by the local keyboard/mouse control unit 12 to the servers 30 belonging to the same group.

When the OSD control unit 15 is started up by the MPU 11 and transits to the OSD mode, the OSD control unit 15 displays a user interface used for operating the KVM switch 10 on the local monitor 21. The setting of the KVM switch 10, state display, the selection of a server port 10b, and the like are performed through the user interface.

Particularly, the OSD control unit 15 is started up by the MPU 11 and outputs a server group name registration screen 21a and a simultaneous operation target server group screen 21b also serving as a server switching screen to the local monitor 21 in the OSD mode. The screens 21a and 21b are used for setting a simultaneous operation target server group information table 16a illustrated in FIG. 2. As will be described later, the simultaneous operation target server group information table 16a is set and registered from screens 21a and 21b. In addition, the screens 21a and 21b will be described later with reference to FIGS. 5 and 6.

Figures 3, 4:
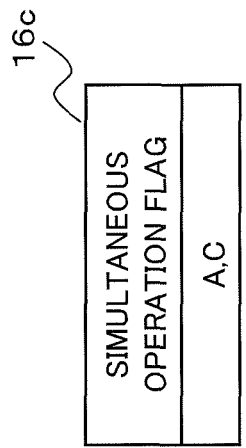
FIG. 3 is a diagram that illustrates an example of an operation sequence information table of initial state synchronization according to this embodiment.
FIG. 4 is a diagram that illustrates an example of a simultaneous operation flag according to this embodiment.

In addition, the OSD control unit 15 is started up by the MPU 11 and outputs an operation sequence registration screen 21c used for setting an operation sequence information table 16b illustrated in FIG. 3 to the local monitor 21 in the OSD mode. As will be described later, the operation sequence information table 16b is set from an operation sequence registration screen 21c for each group. In addition, the operation sequence registration screen 21c will be described later with reference to FIG. 7.

Here, the functions of the above-described control units 12 to 15 may be realized by a circuit that is separate from the MPU 11 or may be realized by executing a predetermined program stored in the storage unit 16 using the MPU 11.

In addition to the functions of a counter 11a and a timer 11b, the MPU (processing unit) 11 realizes various functions (b1) to (b9) described below by executing a predetermined program stored in the storage unit 16. Through such various functions b1 to b9, the MPU 11 realizes an initial state synchronization function and a simultaneous transmission function. The initial state synchronization function is a function for synchronizing the states of all the grouped servers 30 that are connected to the server ports 10b of the analog KVM switch 10.

The simultaneous transmission function is a function for simultaneously transmitting input data (operation information) input from the local console 20 (the USB keyboard 22 and the USB mouse 23) to all the server ports 10b to which the grouped servers 30 are connected after the synchronization according to the initial state synchronization function. In this embodiment, the grouped servers 30 can be operated simultaneously or approximately simultaneously according to the initial state synchronization function and the simultaneous transmission function described above.

(b1) a function for transmitting and outputting an analog video signal transmitted from the video port control unit 13 of the server port 10b selected by the MPU 11 to the local monitor 21 using the MPU 11. In other words, the MPU 11 achieves the function of an operation result transmitting unit that transmits and displays a video signal (a result of the operation for the operation information in the server 30) received by the video port control unit 13 to the local monitor 21.

(b2) a function for transmitting data and a command of the server 30 side that are received by the USB port control unit 14 of the server port 10b selected by the MPU 11 to the local keyboard/mouse control unit 12 using the MPU 11.

(b3) a function for starting up the OSD control unit 15, selecting the server ports 10b to which the servers 30 belonging to the same group are connected in accordance with an input instruction from the screens 21a and 21b to be described later in the OSD mode, and setting the selected server ports 10b (server 30) in the simultaneous operation target server group information table 16a by using the MPU 11.

(b4) a function for starting up the OSD control unit 15 and registering the operation sequence information of the initial state synchronization in the operation sequence information table 16b for each group (group ID) of the server 30 in accordance with an input instruction transmitted from the screen 21c to be described later in the OSD mode by using the MPU 11.

(b5) a function for transmitting the operation sequence information of the initial state synchronization registered for each group to the USB port control units 14 of all the server ports 10b belonging to the simultaneous operation target server group using the MPU 11. In this way, the operation sequence information of the initial state synchronization is transmitted to all the servers 30 belonging to the same group through the USB port control units 14, whereby the initial states (operations) of all the servers 30 belonging to the same group are synchronized. In other words, the MPU 11 achieves the function of a synchronization control unit that synchronizes the operations of the servers 30 belonging to the same group and outputs operation results according to the operation information that have been received from the synchronized servers 30 belonging to the same group to the local monitor 21. At this time, the MPU (synchronization control unit) 11 operates the servers 30 after starting, which belong to the same group, based on the same operation sequence information, thereby causing the servers 30 belonging to the same group to be in the same state. More particularly, the MPU (synchronization control unit) 11 refers to the operation sequence information table 16b for the same group and operates the servers 30 after starting, which belong to the same group, based on the operation sequence information that has been referred to, thereby causing the servers 30 belonging to the same group to be in the same state. Here, the same state, for example, is a state in which a BIOS setting screen (setup menu) is displayed on the displays of the servers 30.

(b6) a function for selectively setting simultaneous operation start or simultaneous operation end in accordance with an input instruction transmitted from the screen 21b to be described later in the OSD mode using the MPU 11.

(b7) a function for transmitting input data input from the USB keyboard 22 or the USB mouse 23 to the USB port control units 14 of all the server ports 10b belonging to the simultaneous operation target server group during a simultaneous operation after the synchronization of the initial states by using the MPU 11. In this way, the input data is transmitted to all the servers 30 belonging to the same group through the USB port control units 14 simultaneously or approximately simultaneously.

(b8) a function for, in a case where there is a server 30 among the servers 30 belonging to the same group that cannot be caused to be in the same state, displaying and outputting an error notification for the server 30 on the local monitor 21 by using the MPU (synchronization control unit) 11.

(b9) a function for referring to the simultaneous operation target server group information table 16a and specifying the servers 30 belonging to the same group based on the information relating to the servers 30 belonging to the same group that has been referred to by using the MPU (synchronization control unit) 11.

By using the functions described above, the MPU (synchronization control unit) 11 realizes the initial state synchronization function and the simultaneous transmission function. In other words, the MPU (synchronization control unit) 11 synchronizes the operations of the servers 30 belonging to the same group by causing the servers 30 belonging to the same group to be in the same state and then transmits the operation information from the operation information transmitting unit 14 to the servers 30 belonging to the same group simultaneously or approximately simultaneously.

In addition, the function of the MPU 11 as the counter 11a and the timer 11b is used when the synchronization process of the initial state is performed for the servers 30 belonging to the same group at the time of inputting power to the servers 30 (at the time of starting). The counter 11a and the timer 11b will be described later in detail with reference to FIGS. 9 and 10.

In addition to the storing of the predetermined program described above, the storage unit 16 stores the simultaneous operation target server group information table 16a, the operation sequence information table 16b of the initial state synchronization, and a simultaneous operation flag 16c. The storage unit 16 may be either an internal storage device such as a random access memory (RAM), a read only memory (ROM), a hard disk drive (HDD), or a solid state drive (SSD), or an external storage device.

In the simultaneous operation target server group information table (group information table) 16a, information relating to servers 30 belonging to the same group is registered in advance. As illustrated in FIG. 2, the group information table 16a includes a table 16a-1 and a table 16a-2.

In the table 16a-1, for each group ID (identification), the name of a group specified by the group ID and target server port numbers (=target server numbers) belonging to the group specified by the group ID are registered. In the example illustrated in FIG. 2, "Server Model A" is assigned to group A specified by a group ID "A" as the group name, and server ports #1, #2, #11, #12, and #18 (in other words, servers #1, #2, #11, #12, and #18) belong to the group.

In the table 16a-2, for each server port number, a simultaneous operation target server group ID and initial state completion information are registered. Here, the simultaneous operation target server group ID is the ID of a group to which the server port 10b (the server 30) specified by each server port number belongs. In a case where the server port 10b (the server 30) specified by the server port number (=the server number) does not belong to a group, "-" (hyphen) is registered in the simultaneous operation target server group ID. In addition, as the initial state information, "SUCCESS" representing that the initial state synchronization process has been completed or "ERROR" representing that the initial state synchronization process has failed is registered. In a case where the corresponding server port 10b (the corresponding server 30) is in the synchronization process of the initial state or does not belong to a group, "-" is registered as the initial state information.

In addition, the group name included in the table 16a-1 is set and registered from the server group name registration screen 21a to be described later with reference to FIG. 5. Furthermore, the target server port number included in the table 16a-1 and the simultaneous operation target server group ID included in the table 16a-2 are set and registered from the simultaneous operation target server group screen 21b serving also as the server switching screen which will be described later with reference to FIG. 6.

In the operation sequence information table 16b of the initial state synchronization, as illustrated in FIG. 3, a standby time elapsing since the last operation and a content of an operation that is to be performed at a time point when the standby time elapses are registered for each sequence number of the initial state synchronization process as operation sequence information. The operation sequence information table 16b is set for each group registered in the table 16a-1. As the content of the operation, a combination of a plurality of keys may be registered, and the pressing of a button of the mouse or movement of the pointer may be registered. Here, the pressing of a key is pressing down the key and then releasing the key. In addition, the standby time and the content of an operation included in the operation sequence information table 16b are set and registered from the operation sequence registration screen 21c to be described later with reference to FIG. 7.

In the example illustrated in FIG. 3, the table 16b is set for the group A that is specified by the group ID "A". In the table 16b illustrated in FIG. 3, in the first sequence (sequence number 1) of the initial state synchronization process, 3 seconds are set as the standby time after the input of power, and "pressing of an "ESC" key of the keyboard" is set as the content of the operation. In addition, in the second sequence (sequence number 2), 30 seconds are set as the standby time after the execution of the process of the sequence number 1, and "pressing of an "F2" key of the keyboard" is set as the content of the operation.

Accordingly, for each server 30 belonging to the same group A, when 3 seconds elapse after the starting of each server 30, an "ESC" key pressing signal is input, and, when 30 seconds elapse after the input of the "ESC" key pressing signal, an "F2" key pressing signal is input. Therefore, the initial states of the servers 30 belonging to the same group A become a state in which the BIOS setting screen is displayed on the displays of the servers 30 and are synchronized.

In the simultaneous operation flag 16c, as illustrated in FIG. 4, the group IDs of groups that are in the simultaneous operation are registered. For example, in a case where groups A and C are in the simultaneous operations, as illustrated in FIG. 4, group IDs "A" and "C" are registered in the simultaneous operation flag 16c. When an action giving an instruction for ending the simultaneous operation is performed for a group that is in the simultaneous operation, the group ID of the group of which the simultaneous operation is to be ended is deleted from the simultaneous operation flag 16c. On the contrary, in a case where an action giving an instruction for starting a simultaneous operation for a group, for which the simultaneous operation has not been performed, is performed, the group ID of the group for which the simultaneous operation is to be started is additionally registered in the simultaneous operation flag 16c. The group ID is registered in or deleted from the simultaneous operation flag 16c in accordance with whether the simultaneous operation start button on the simultaneous operation target server group screen 21b serving also as the server switching screen to be described later is pressed or a specific key sequence is performed.

[2] Operations of Information Processing System and Analog KVM Switch According to this Embodiment Next, the operations of the information processing system 1 and the analog KVM switch 10 described above will be described with reference to FIGS. 5 to 13.

[2-1] Setting Registration Screen

Figure 6:
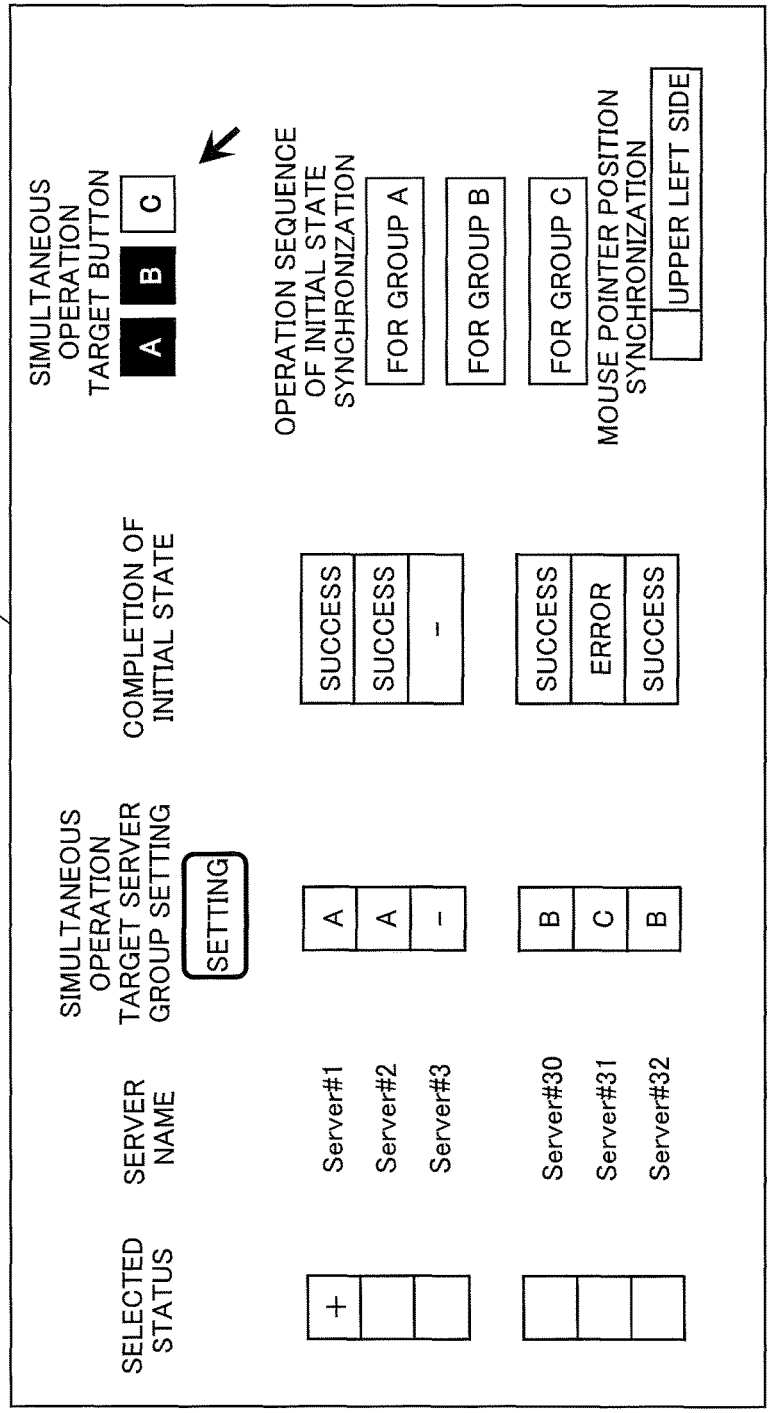
FIG. 6 is a diagram that illustrates an example of an simultaneous operation target server group screen also serving as a simultaneous server switching screen according to this embodiment.
Figure 7:
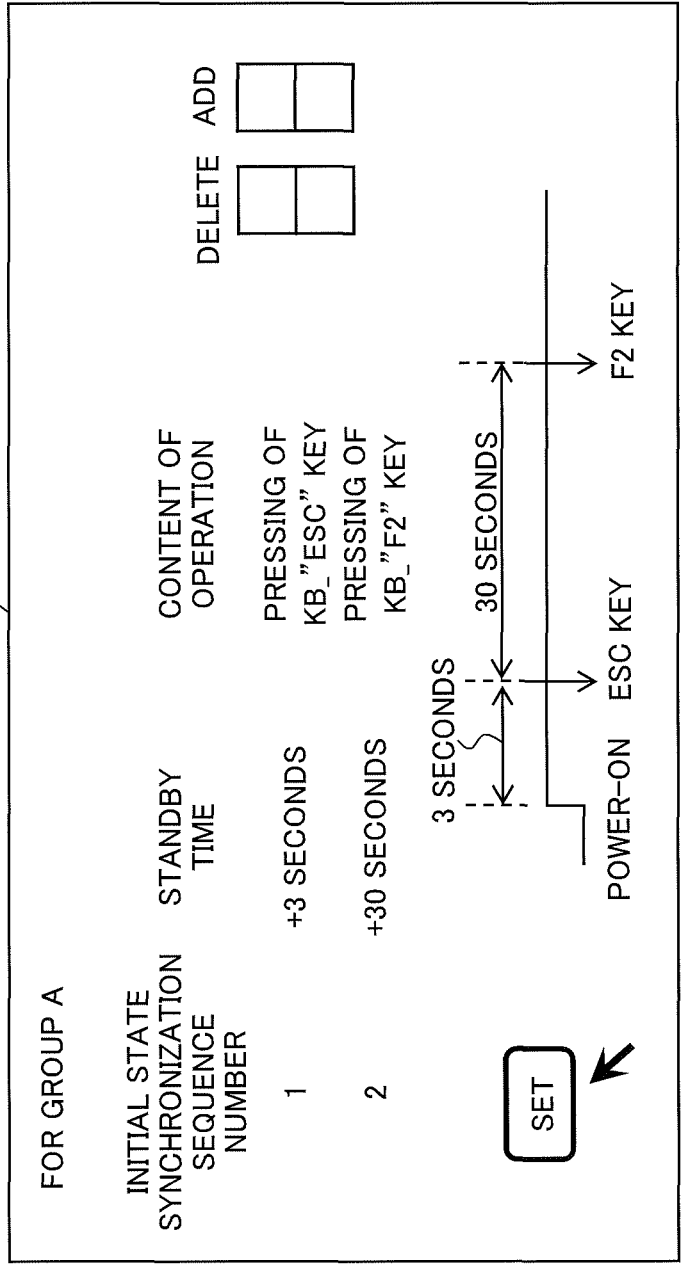
FIG. 7 is a diagram that illustrates an example of an operation sequence registration screen of initial state synchronization according to this embodiment.

First, the server group name registration screen 21a, the simultaneous operation target server group screen 21b serving also as the server switching screen, and the operation sequence registration screen 21c of the initial state synchronization displayed on the local monitor 21 in the OSD mode when the setting and registration are performed in the analog KVM switch 10 according to this embodiment will be described with reference to FIGS. 5 to 7. FIG. 5 is a diagram that illustrates an example of the server group name registration screen 21a according to this embodiment. FIG. 6 is a diagram that illustrates an example of the simultaneous operation target server group screen 21b serving also as the server switching screen according to this embodiment. FIG. 7 is a diagram that illustrates an example of the operation sequence registration screen 21c of the initial state synchronization according to this embodiment.

[2-1-1] Server Group Name Registration Screen (Group Information Setting Screen)

Figure 5:
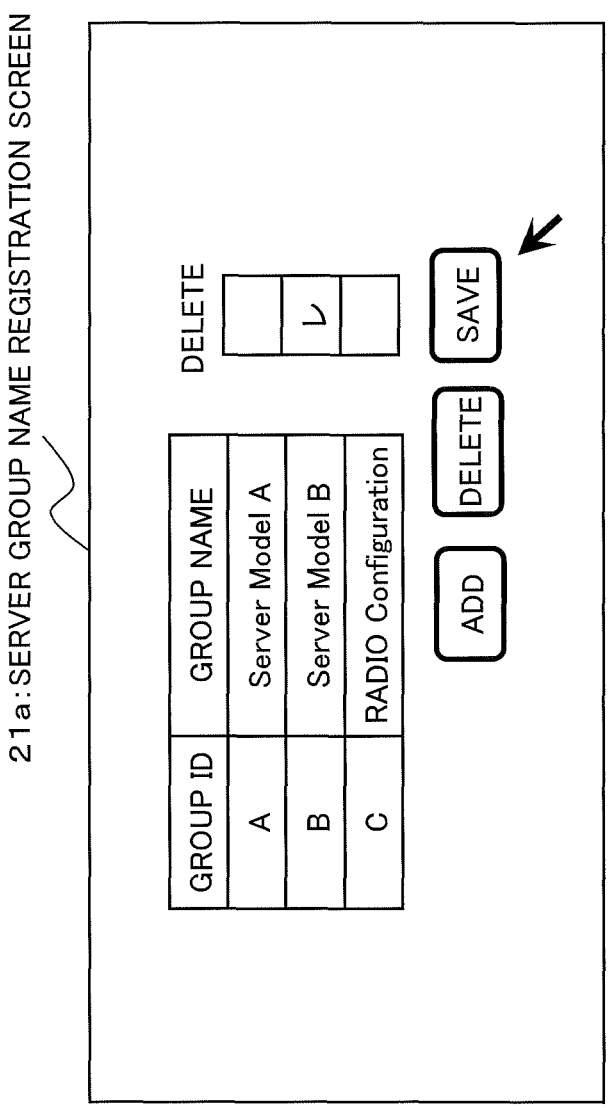
FIG. 5 is a diagram that illustrates an example of a server group name registration screen according to this embodiment.

The server group name registration screen 21a, as illustrated in FIG. 5, is used on a menu displayed on the OSD menu when the name of a simultaneous operation target server group is registered in the table 16a (see FIG. 2), or when a registered group name is deleted.

By an operator clicking on an add button by operating the USB mouse 23, one row of a new record for group registration is added. Then, the operator inputs a group name as the group name of the added record and clicks on a save button, whereby the group name for the new group ID is registered in the table 16a. In a case where a group registered in the table 16a is to be deleted, the operator writes a check mark by clicking on a check box corresponding to the group to be deleted and then clicks on a deletion button, whereby information relating to the group is deleted from the table 16a.

As group IDs, alphabets are automatically assigned in alphabetical order. When the add button is clicked in the state (for example, A and C) in which an alphabet representing the group ID is missing due to a deletion operation, a record to which "B" is assigned as the group ID is added. On the other hand, in a case where the add button is clicked in the state (for example, A, B, and C) in which no alphabet representing the group ID is missing, a record to which "D" is assigned as the group ID is added.

[2-1-2] Simultaneous Operation Target Server Group Screen (Group Information Setting Screen) Serving Also as Server Switching Screen The simultaneous operation target server group screen 21b (group information setting screen) serving also as the server switching screen, as illustrated in FIG. 6, is a menu that is displayed on the local monitor 21 in the OSD menu. In a "selection state" region of the screen 21b, check boxes representing the selection states are provided in correspondence with the server names of the registered servers, and the server 30 (the server port 10b) corresponding to the check box in which "+" is written is selected. Then, the power input state of the selected server is configured to be identified by the operator based on the display color of the server name. In addition, in this embodiment, a video signal transmitted from the server 30 (the server port 10b) corresponding to the check box in which "+" is set is transmitted and displayed to/on the local monitor 21 through the MPU 11.

In addition, in a "simultaneous operation target server group setting" region of the screen 21b, the group (A, B, or C) to which each server port 10b (each server 30) belongs is selected, or it is selected whether each server port does not belong to any group ("-"). Then, by clicking on a setting button, a result of the selection is reflected on the table 16a (see FIG. 2).

In an "initial state completion" region of the screen 21b, for each server port 10b (server 30), as described above with reference to FIG. 2, "SUCCESS" representing the completion of the initial state synchronization process or "ERROR" representing the failure of the initial state synchronization process is displayed. In addition, in a case where the server port 10*b* (the server 30) is in the synchronization process of the initial state or does not belong to any group, "-" is displayed.

The "simultaneous operation start button" of the screen 21*b* is clicked when a simultaneous operation is started or ended. A state in which a white character is displayed on a black background represents that a group corresponding to an alphabet displayed on the button is in a simultaneous operation state. On the other hand, a state in which a black character is displayed on a white background represents that a group corresponding to an alphabet displayed on the button is not in the simultaneous operation state. The "simultaneous operation start button" is displayed for each group that is registered in the table 16*a* (see FIG. 2). When the simultaneous operation is started by clicking on the "simultaneous operation start button" represented in a black character display (white background display), the clicked button is reversed to be a white character display (black background display), and an alphabet corresponding to the "simultaneous operation start button" that has been clicked is registered in the simultaneous operation flag 16*c*. On the other hand, when the simultaneous operation is ended by clicking on the "simultaneous operation start button" represented in a white character display (black background display), the clicked button is reversed to be a black character display (white background display), and an alphabet corresponding to the "simultaneous operation start button" that has been clicked is deleted from the simultaneous operation flag 16*c*.

In an "operation sequence of the initial state synchronization" region of the screen 21*b*, a "group A" button, a "group B" button, and a "group C" button are displayed. When any one of such buttons is clicked, the operation sequence registration screen 21*c* of the initial state synchronization illustrated in FIG. 7 is displayed for a group corresponding to the clicked button on the local monitor 21. In addition, the buttons arranged in the "operation sequence of the initial state synchronization" region are displayed for each group registered in the table 16*a* (see FIG. 2).

In a "mouse pointer position synchronization" region of the screen 21*b*, for example, any one of the upper left side, the upper right side, the lower left side, and the lower right side may be selected. FIG. 6 illustrates an example in which the "upper left side" is selected. Then, when a left button arranged in the "upper left side" display area is clicked, in a case where the server port 10*b* (the server 30) that is currently selected is in the simultaneous operation, movement amounts X and Y for moving the mouse pointer to the "upper left side" for all the server ports 10*b* included in a group to which the server port 10*b* belongs are transmitted from the MPU 11. As illustrated in FIG. 6, in a case where the "upper left side" is selected, it is assumed that the mouse pointer is located on the "lower right" side that is farthest therefrom, and mouse movement information (movement amounts X and Y) corresponding to a movement from the "lower right side" to the "upper left side" is transmitted, whereby the mouse pointer moves to the "upper left side". In this way, the mount pointers are displayed at the same "upper left side" position on the display screens of all the servers 30 belonging to the same group.

[2-1-3] Operation Sequence Registration Screen of Initial State Synchronization (Operation Sequence Information Setting Screen)

The operation sequence registration screen (operation sequence information setting screen) 21*c* of the initial state synchronization, as illustrated in FIG. 7, is a menu displayed on the local monitor 21 in the OSD mode. The screen 21*c* is displayed for each group registered in the table 16*a* (see FIG. 2). The operator sets a standby time and the content of an operation described above with reference to FIG. 3 for each initial state synchronization operation sequence number and then clicks on the setting button on the screen 21*c*. Accordingly, the operation sequence information of a corresponding group (the group A illustrated in FIG. 7) is registered in the operation sequence information table 16*b*.

In a case where the content of a specific initial state synchronization operation sequence number is to be deleted, the operator clicks on a deletion check box of the sequence number desired to be deleted and then clicks on the setting button. In accordance with this, the sequence numbers are automatically renumbered sequentially from one. In addition, in a case where a new initial state synchronization sequence is to be added, the operator clicks on an add check box of a sequence number desired to be added and then clicks on the setting button, whereby a record for a new sequence is additionally displayed. Then, the operator sets a standby time and the content of an operation in the new record that is additionally displayed and then clicks on the setting button. In accordance with this, the sequence numbers are automatically renumbered sequentially from one, and operation sequence information to which the new sequence is added is registered in the operation sequence information table 16*b*. In a case where the setting of a record corresponding to the clicked additional check box has been performed in advance, a record for a new sequence is additionally displayed before or after the record.

[2-2] Flow of Process According to Analog KVM Switch

Figure 8:
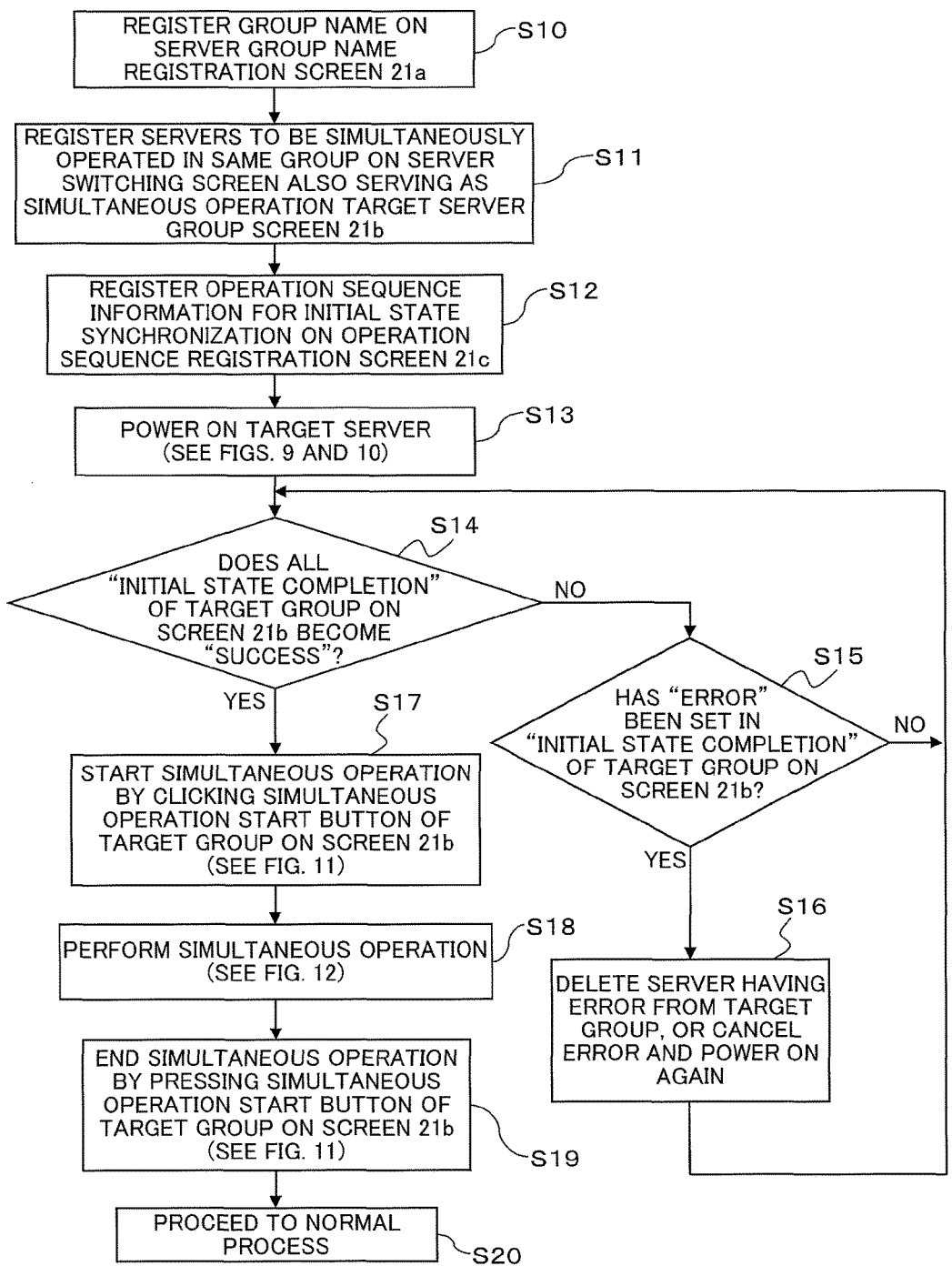
FIG. 8 is a flowchart that illustrates the flow of the process performed by the analog KVM switch according to this embodiment.

Next, the flow of the process according to the analog KVM switch 10 of this embodiment will be described along a flowchart (Steps S10 to S20) illustrated in FIG. 8. The flow of the process described here is a work flow of the entire process in which, after a simultaneous operation target server group and simultaneous operation sequence information are registered, power is input to servers, and a simultaneous operation is started and end.

First, in Step S10, the operator registers the name of a server group to be simultaneously operated in the simultaneous operation target server group information table 16*a* (see FIG. 2) on the server group name registration screen 21*a* (see FIG. 5) displayed on the local monitor 21 in the OSD mode. In the examples illustrated in FIGS. 2 and 5, the names of the groups of three group IDs "A" to "C" are set and registered.

In addition, in Step S11, the operator sets and registers a server group such that servers 30 that are simultaneously operated belong to the same group on the simultaneous operation target server group screen 21*b* (see FIG. 6) serving also as the server switching screen displayed on the local monitor 21 in the OSD mode. At this time, in the "simultaneous operation target server group setting" region of the screen 21*b*, the group (A, B, or C) to which each server port 10*b* (each server 30) belongs is selected, or it is selected whether each server port 10*b* does not belong to any group ("-"). Then, by the operator clicking on the setting button, a result of the selection is reflected and registered in the simultaneous operation target server group information table 16*a* (see FIG. 2).

Then, in Step S12, the operator sets an operation sequence of the keyboard/the mouse to be executed so as to synchronize the initial states of all the target servers belonging to the same group for each group on the operation sequence registration screen 21*c* (see FIG. 7) of the initial state synchronization that is displayed on the local monitor 21 in the OSD mode. Then, the operator clicks on the setting button, whereby the operation sequence information for each group is registered in the operation sequence information table 16*b* (see FIG. 3). Here, as described above with reference to FIG. 3, the operation sequence for the servers 30 is set such that a BIOS setting screen is displayed on the displays of the servers 30 belonging to the group A.

After such setting and registration are performed, power is input to all the servers 30 in Step S13. At this time, in each server 30, in the sequence to be described later with reference to FIGS. 9 and 10, the synchronization process of the initial states is performed. According to the synchronization process of the initial states, for example, the servers 30 belonging to the group A are in the initial state in which a BIOS setup menu is displayed on the displays.

Then, in Step S14, the operator or the MPU 11 checks that all the servers 30 belonging to the same group are in the same initial state. The checking of the initial states may be performed by referring to the screens of the servers 30 or may be performed by referring to "SUCCESS" displayed in the "initial state completion" region of the simultaneous operation target server group screen 21*b* (see FIG. 6) serving also as the server switching screen.

In a case where "SUCCESS" is not set in the "initial state completion" regions of all the servers 30 belonging to the same target group on the screen 21*b* (No route of Step S14), in Step S15, it is checked whether or not "ERROR" is set in at least one of the "initial state completion" regions of the screen 21*b*. In a case where "ERROR" is not set (No route of Step S15), the operator or the MPU 11 is returned to the process of Step S14. On the other hand, in a case where "ERROR" is set (Yes route of Step S15), the operator or the MPU 11 deletes the server 30 for which the error (synchronization failure) occurs from the target group (table 16*a*) or resolves the error and inputs power to the server 30 again, and then, the process is returned to the process of Step S14.

On the other hand, in a case where "SUCCESS" is set in the "initial state completion" regions for all the servers 30 belonging to the target group on the screen 21*b* (Yes route of Step S14), the initial states of all the servers 30 belonging to the target group (same group) are in a synchronized state. Accordingly, the servers 30 belonging to the target group are in a state in which a simultaneous operation can be started.

In such a state, when the simultaneous operation start button (the button represented in the black character display (the white background display): a button that is not in the simultaneous operation) arranged on the screen 21*b* is clicked, or when a specific key sequence (for example, Ctrl+Alt+S+C; a simultaneous operation start instruction for the group C) is input, the simultaneous operation of a specific group (for example, the group C) is started in Step S17. The process performed when the simultaneous operation is started will be described later with reference to FIG. 11.

When the simultaneous operation is started, a simultaneous operation work is performed in Step S18. The sequence of the simultaneous operation work will be described later with reference to FIGS. 12 and 13. During the simultaneous operation, input data input from the USB keyboard 22 and the USB mouse 23 of the local console 20 is simultaneously transmitted to the USB port control units 14 of the simultaneous operation target servers (for example, servers belonging to the group C) 30. At this time, since the simultaneous operation target servers 30 are in the same initial state, by simultaneously transmitting the same input data to the simultaneous operation target servers 30, the same operation results (same screens) can be acquired from the simultaneous operation target servers 30. Accordingly, when the operator operates the keyboard 22 or the mouse 23 in a state in which an operation result acquired from one server 30 (the server port 10*b*) among the simultaneous operation target servers 30 is selected and is displayed on the local monitor 21 as a selection server screen, the same results (screens) can be acquired from all the simultaneous operation target servers 30.

Figure 12:
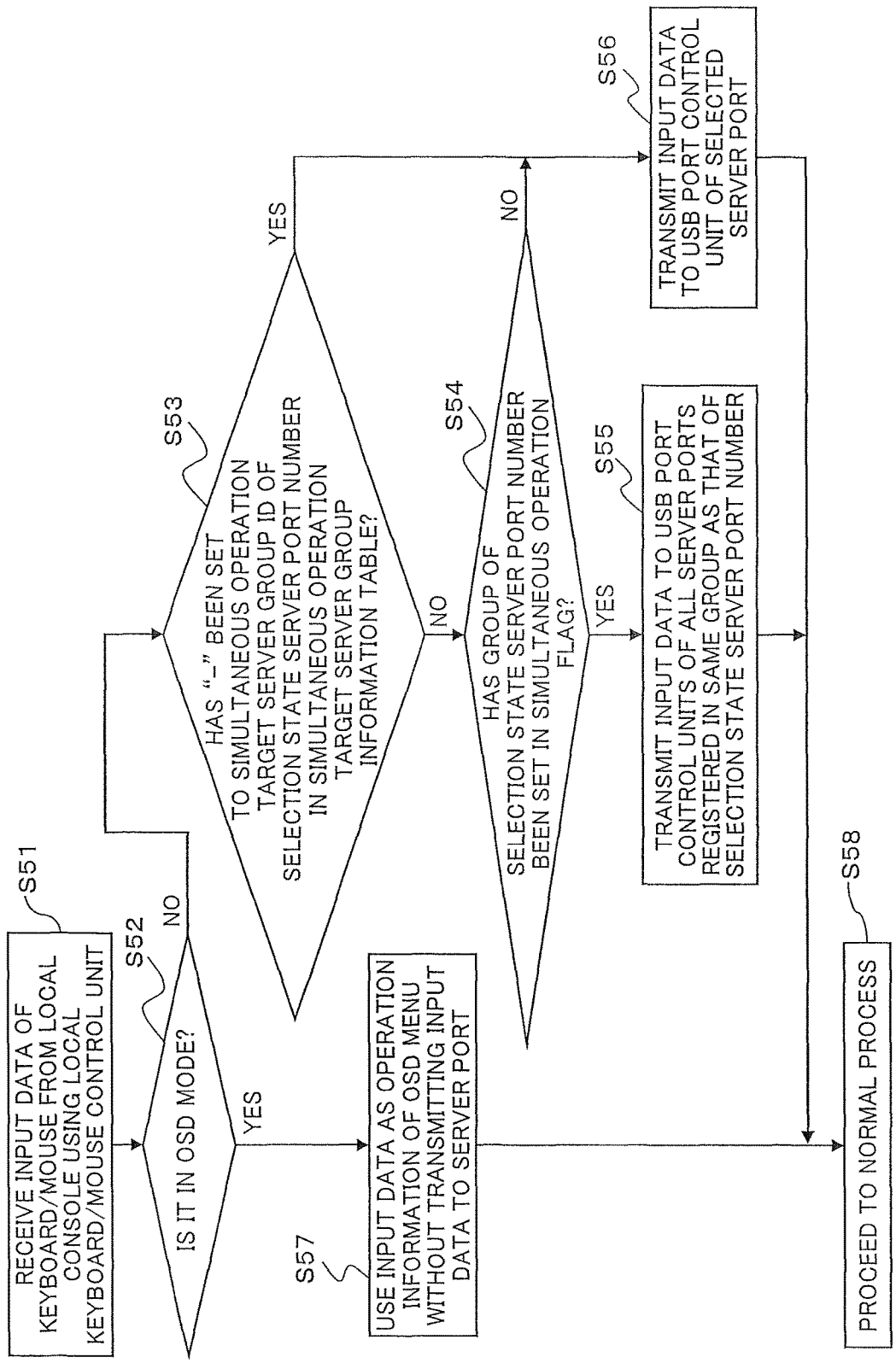
FIG. 12 is a flowchart that illustrates a transmission process (simultaneously operation process/simultaneous transmission process) of input data input from the local console according to this embodiment.

Even during the simultaneous operation, the selected server port 10*b* can be changed through the screen 21*b* displayed in the OSD mode, and input data input from the local port 10*a* is processed according to a process to be described later with reference to FIG. 12. Accordingly, a connection state between the local port 10*a* and another group of the simultaneous operation target servers 30 or a server port 10*b* of a non-simultaneous operation target can be arbitrarily changed, and a keyboard operation or a mouse operation for the server 30 after the change can be performed.

In addition, even during the simultaneous operation, the simultaneous operation target servers 30 belonging to the same group can be arbitrary changed. The changed content is reflected when the MPU 11 is returned from the OSD mode, and the target for the transmission of input data input from the local keyboard/mouse control unit 12 is switched to the target after the change.

In addition, the operator may be notified that the KVM switch 10 is in the simultaneous operation by displaying "During Simultaneous Operation" on the local monitor 21 using the OSD function in a non-OSD mode. Alternatively, the operator may be notified that the KVM switch 10 is in the simultaneous operation by turning on/blinking a status indicator (Num Lock, Caps Lock, or Scroll Lock) of the keyboard 22 of the local console 20 in a specific display pattern.

Then, by clicking on the simultaneous operation start button (the button represented in the white character display (the black background display); a button that is represented in the simultaneous operation) arranged on the screen 21*b* or inputting a specific key sequence (for example, Ctrl+Alt+E+C; a synchronization operation end instruction of the group C), the simultaneous operation of a specific group (for example, the group C) ends in Step S19. Thereafter, the MPU 11 is returned from the simultaneous operation state to a normal process state in Step S20.

[2-3] Process at Time of Inputting Power to Server (Initial State Synchronization Process)

Next, the process performed at the time of inputting power to server according to this embodiment, in other words, the synchronization process of the initial states for synchronizing the states of all the servers 30 connected to the server ports 10*b* belonging to the same group will be described along a flowchart (Steps S21 to S26) illustrated in FIG. 9 and a flowchart (Steps S31 to S40) illustrated in FIG. 10.

Figure 9:
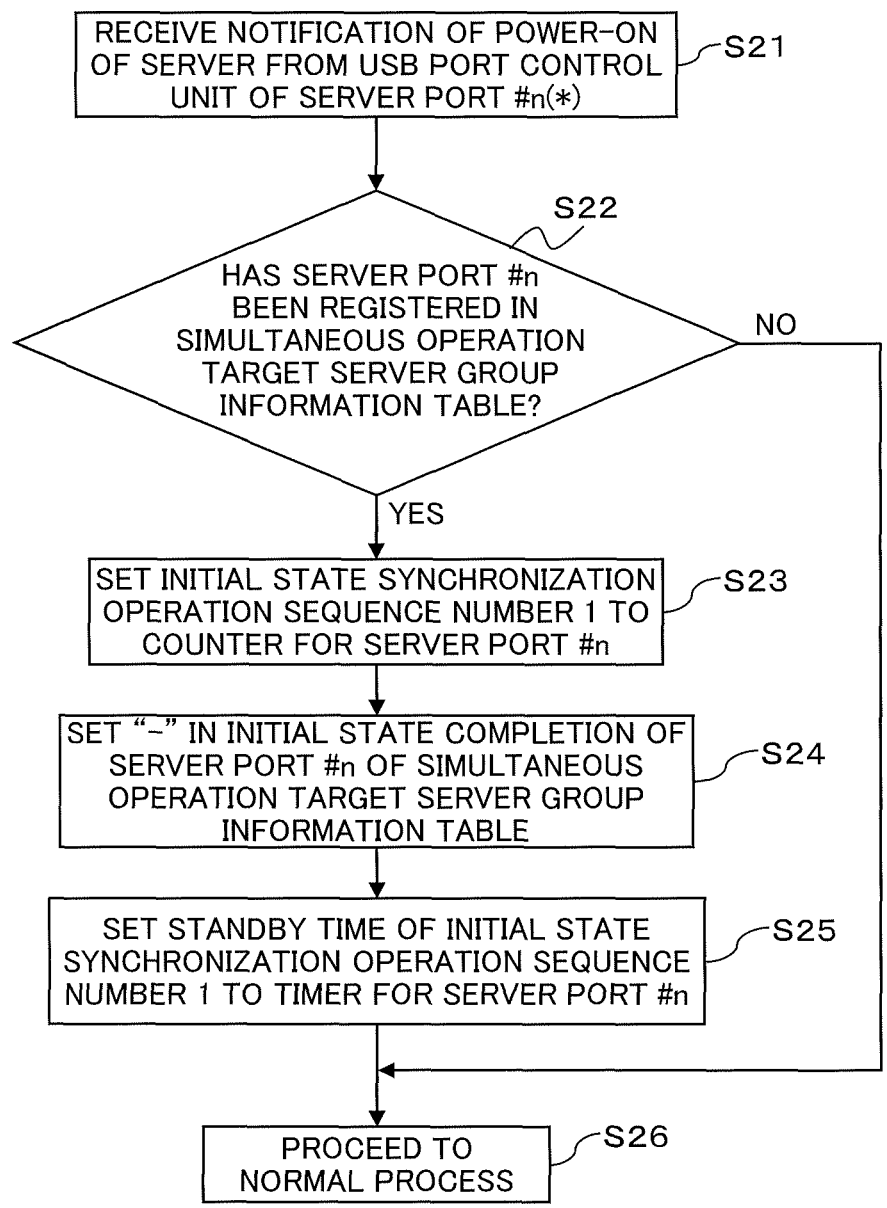
FIGS. 9 and 10 are flowcharts that illustrate the processes (synchronization processes of initial states) performed at the time of inputting power to servers according to this embodiment.
Figure 10:
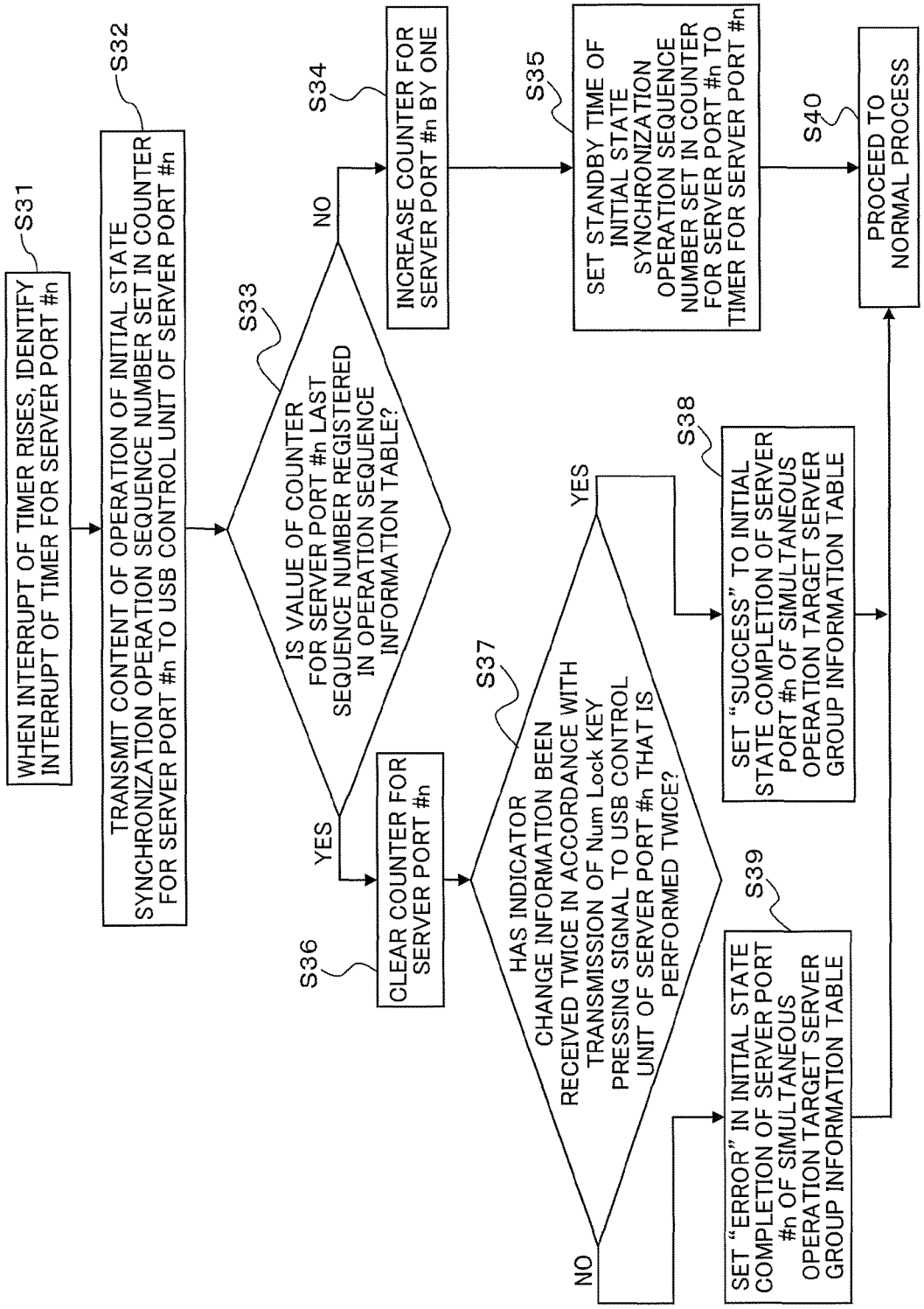

First, when power is input to server #n connected to server port #n, the MPU 11 performs the process of Steps S21 to S26 illustrated in FIG. 9.

In other words, when being notified that the power is input to server #n from the USB port control unit 14 of server port #n in Step S21, the MPU 11 refers to the simultaneous operation target server group information table 16*a* stored in the storage unit 16 and determines whether or not server port #n is registered in the table 16*a* in Step S22. In a case where server port #n is not registered in the table 16*a* (No route of Step S22), the MPU 11 transits to the normal process in Step S26.

On the other hand, in a case where server port #n is registered in the table 16a (Yes route of Step S22), the MPU 11 refers to the operation sequence information table 16b stored in the storage unit 16 and then sets an initial state synchronization operation sequence number 1 to the counter 11a for server port #n in Step S23. In addition, in Step S24, the MPU 11 sets "-" representing that the synchronization process of initial states is in the process in the initial state completion information of server port #n in the simultaneous operation target server group information table 16a.

Thereafter, in Step S25, the MPU 11 sets a standby time (for example, in a case of the table 16b illustrated in FIG. 3, 3 seconds) of the initial state synchronization operation sequence number 1 in the timer 11b for server port #n, and then transits to the normal process in Step S26. Accordingly, the timer 11b for server port #n measures the set standby time. When the standby time (for example, 3 seconds) elapses after the input of the power, the time of the timer 11b is up, and the interrupt of the timer 11b rises. When the interrupt of the timer 11b rises, the MPU 11 identifies the occurrence of an interrupt of server port #n in Step S31 and performs the process of Steps S31 to S40 illustrated in FIG. 10.

When the interrupt is received from the timer 11b for server port #n, in Step S32, the MPU 11 individually transmits the content of the operation of the initial state synchronization operation sequence number set by the counter 11a for server port #n to the USB port control unit 14 of server port #n. Accordingly, in the case of the table 16b illustrated in FIG. 3, when 3 seconds elapse after the input of the power of server #n belonging to the group A, an "ESC" key pressing signal is individually input to server #n through the USB port control unit 14.

Thereafter, in Step S33, the MPU 11 determines whether or not the value of the counter 11a for server port #n is the last sequence number (for example, in the case of the table 16b illustrated in FIG. 3, "2") registered in the table 16b. In a case where the value of the counter 11a for server port #n is not the last sequence number (No route of Step S33), the MPU 11 increments the counter 11a for server port #n by "1" in Step S34.

In addition, in Step S35, the MPU 11 sets the standby time of the initial state synchronization operation sequence number set by the counter 11a for server port #n in the timer 11b for server port #n and then transits to the normal process in Step S40. At this time, in the case of the table 16b illustrated in FIG. 3, 30 seconds that is the standby time of the initial state synchronization operation sequence number 2 is set in the timer 11b for server port #n.

In this way, the timer 11b for server port #n measures the set standby time. When the standby time (for example, 30 seconds) elapses after the execution of the initial state synchronization operation sequence number 2, the time of the timer 11b is up, and the interrupt of the timer 11b rises. When the interrupt of the timer 11b rises, until it is determined that the value of the counter 11a for server port #n is the last sequence number in Step S33 (Yes route), the MPU 11 repeatedly performs the process of Steps S31 to S35 described above.

In addition, in the case of the table 16b illustrated in FIG. 3, when 30 seconds elapse after the "ESC" key pressing signal is transmitted and input to server #n, an "F2" key pressing signal is input to server #n through the USB port control unit 14. Thereafter, it is determined that the value of the counter 11a for server port #n is the last sequence number in Step S33 (Yes route), and the MPU 11 performs the process of Steps S36 to S40.

In this way, the MPU 11 refers to the operation sequence information table 16b set for each group and executes the content of the operation of sequence number 1 after the elapse of the standby time of sequence number 1. Thereafter, similarly, until the value of the counter 11a for server port #n is the last sequence number, the MPU 11 refers to the table 16b and sequentially executes the content of the operation of sequence number i after the elapse of the standby time of sequence number i (here, i is an integer of 2 or more). The counter 11a and the timer 11b are provided for each server port, and thus, this synchronization operation process is independently performed for each server port. In addition, in the "initial state completion" region of the simultaneous operation target server group information table 16a, "-" is set during the execution of the synchronization operation of initial states, as described below, and "SUCCESS" or "ERROR" is set in accordance with the state of communication with the server 30 after the completion of the synchronization operation in Steps S37 to S39.

In a case where the value of the counter 11a for server port #n is the last sequence number, in other words, in a case where the operation sequence of the initial state synchronization is completed (Yes route of Step S33), the MPU 11 clears the counter 11a for server port #n in Step S36. Thereafter, the MPU 11, for example, consecutively transmits a Num Lock key pressing signal to server #n twice through the USB port control unit 14 of server port #n. Then, in Step S37, the MPU 11 determines whether or not indicator change information has been received twice from server #n through the USB port control unit 14 of server port #n in accordance with the transmission of the Num Lock key pressing signal that is performed twice.

In a case where the indicator change information has been received twice (Yes route of Step S37), the MPU 11 determines the initial state synchronization process for server #n to be successful and, in Step S38, sets "SUCCESS" in the "initial state completion" region of server #n that is arranged in the table 16a.

On the other hand, although the Num Lock key pressing signal has been transmitted twice, in a case where the indicator change information has not been received from server #n (No route of Step S37), the MPU 11 determines that the initial state synchronization process for server #n has been failed and, in Step S39, sets "ERROR" in the "initial state completion" region of server #n that is arranged in the table 16a. After setting "SUCCESS" or "ERROR", the MPU 11 transits to the normal process in Step S40. Here, by consecutively transmitting the Num Lock key pressing signal twice, communication acknowledgement of server #n is performed without changing the turning on/off state of the Num Lock light emitting diode (LED) of the keyboard of server #n.

[2-4] Process at Time of Starting/Ending Simultaneous Operation

Figure 11:
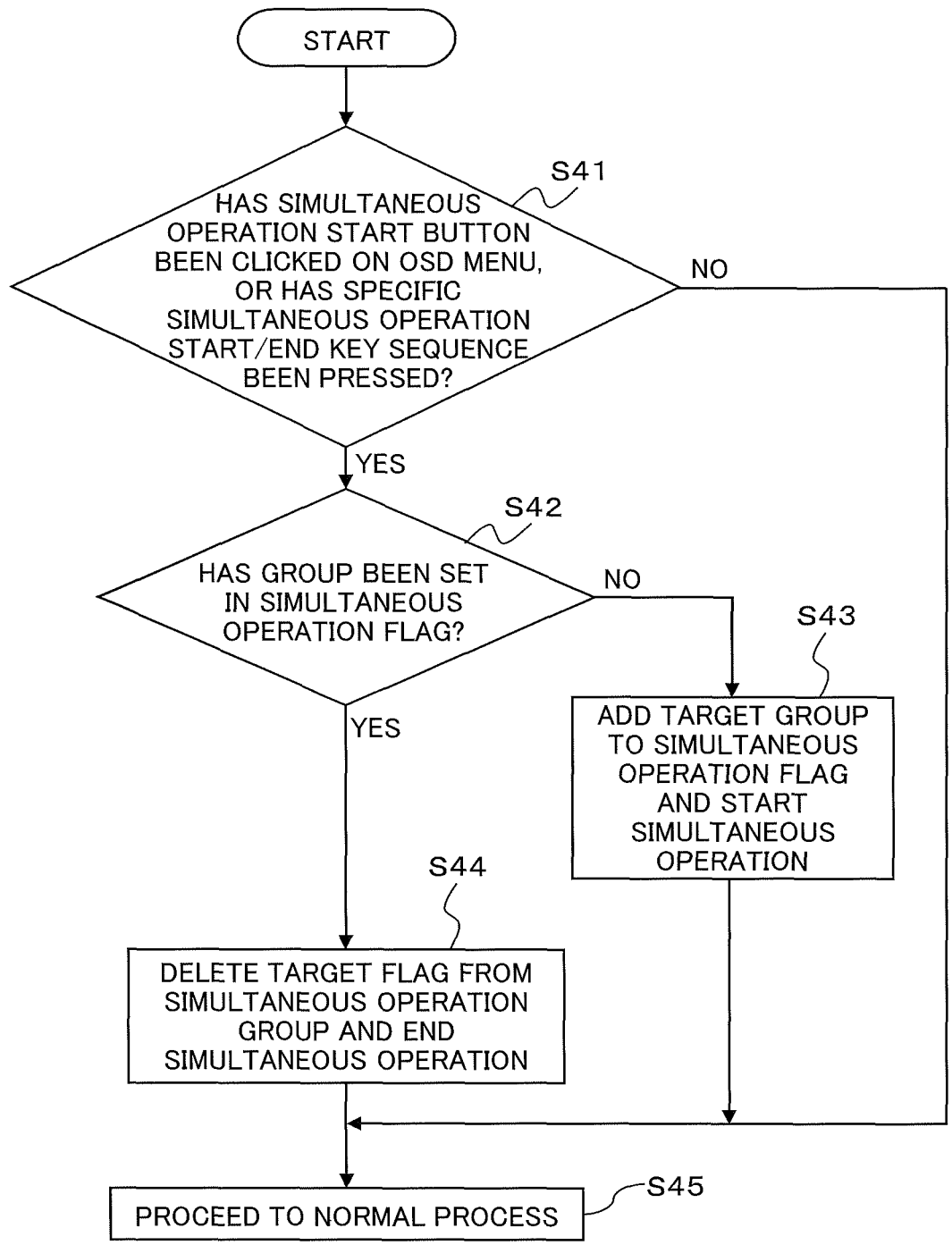
FIG. 11 is a flowchart that illustrates the process performed at the time of starting/ending a simultaneous operation according to this embodiment.

Next, a simultaneous operation process for transmitting input data (operation information) input from the local console 20 to all the server ports 10b to which grouped servers 30 are connected after the synchronization of the initial states will be described with reference to FIGS. 11 to 13.

First, here, the process (see Steps S17 and S19 illustrated in FIG. 8) performed at the time of starting/ending the simultaneous operation according to this embodiment will be described along a flowchart (Steps S41 to S45) illustrated in FIG. 11.

In Step S41, the MPU 11 determines the occurrence of a trigger for starting/ending the simultaneous operation based on whether the simultaneous operation start button is clicked on the OSD menu (the screen 21*b*; see FIG. 6) or whether a specific simultaneous operation start/end key sequence is pressed. In a case where there is neither a click on the simultaneous operation start button nor the pressing of the specific key sequence (No route of Step S41), the MPU 11 transits to the normal process in Step S45.

In a case where the simultaneous operation start button is clicked, or a specific key sequence is pressed (Yes route of Step S41), the MPU 11 refers to the simultaneous operation flag 16*c* (see FIG. 4) of the storage unit 16. Then, in Step S42, the MPU 11 determines whether a group ID of a group designated by the simultaneous operation start button or the specific key sequence is registered in the simultaneous operation flag 16*c*.

In a case where the group ID is not registered in the simultaneous operation flag 16*c*, in other words, in a case where the group is not in the simultaneous operation (No route of Step S42), in Step S43, the MPU 11 additionally registers the group ID (the ID of the target group) in the simultaneous operation flag 16*c* and starts a simultaneous operation for servers 30 belonging to the group. Thereafter, the MPU 11 transits to the normal process in Step S45.

On the other hand, in a case where the group ID is registered in the simultaneous operation flag 16*c*, in other words, in a case where the group is in the simultaneous operation (Yes route of Step S42), in Step S44, the MPU 11 deletes the group ID (the ID of the target group) from the simultaneous operation flag 16*c* and ends the simultaneous operation for servers 30 belonging to the group. Thereafter, the MPU 11 transits to the normal process in Step S45.

[2-5] Transmission Process of Input Data (Simultaneous Operation Process/Simultaneous Transmission Process)

Next, along a flowchart (Steps S51 to S58) illustrated in FIG. 12, the transmission process (the simultaneous operation process/simultaneous transmission process; see Step S18 illustrated in FIG. 8) of input data input from the local console 20 according to this embodiment will be described with reference to FIG. 13. FIG. 13 is a diagram that illustrates an example of the flow of data at the time of performing the simultaneous operation process according to this embodiment.

First, when the local keyboard/mouse control unit 12 receives input data from the local console 200 (Step S51), the MPU 11 determines whether or not the process is in the OSD mode (Step S52). During the OSD mode (Yes route of Step S52), the MPU 11 uses the input data received in Step S51 as the operation information of the OSD menu without transmitting the input data to the server port 10*b* (Step S57) and is returned to the normal process (Step S58).

In a case where the process is not in the OSD mode (No route of Step S52), the MPU 11 refers to the simultaneous operation target server group information table 16*a* stored in the storage unit 16 and checks whether or not the selected server port 10*b* has been grouped. In other words, the MPU 11 determines whether "-" is set in the simultaneous operation target server group corresponding to the port number of the server port 10*b* that has been selected in the table 16*a* (Step S53).

In a case where "-" is not set (No route of Step S53), the MPU 11 refers to the simultaneous operation flag 16*c* stored in the storage unit 16 and, in Step S54, determines whether or not a group ID of a group to which the selected server port 10*b* belongs is set in the simultaneous operation flag 16*c*. In a case where the group ID is set in the simultaneous operation flag 16*c* (Yes route of Step S54), in other words, in a case where the group to which the selected server port 10*b* belongs is in the synchronization operation, the MPU 11 refers to the table 16*a* stored in the storage unit 16. Then, in Step S55, the MPU 11 transmits the input data to the USB port control units 14 of all the server ports 10*b* registered in the same group as the group to which the selected server port 10*b* belongs. Thereafter, the MPU 11 transits to the normal process in Step S58.

Figure 13:
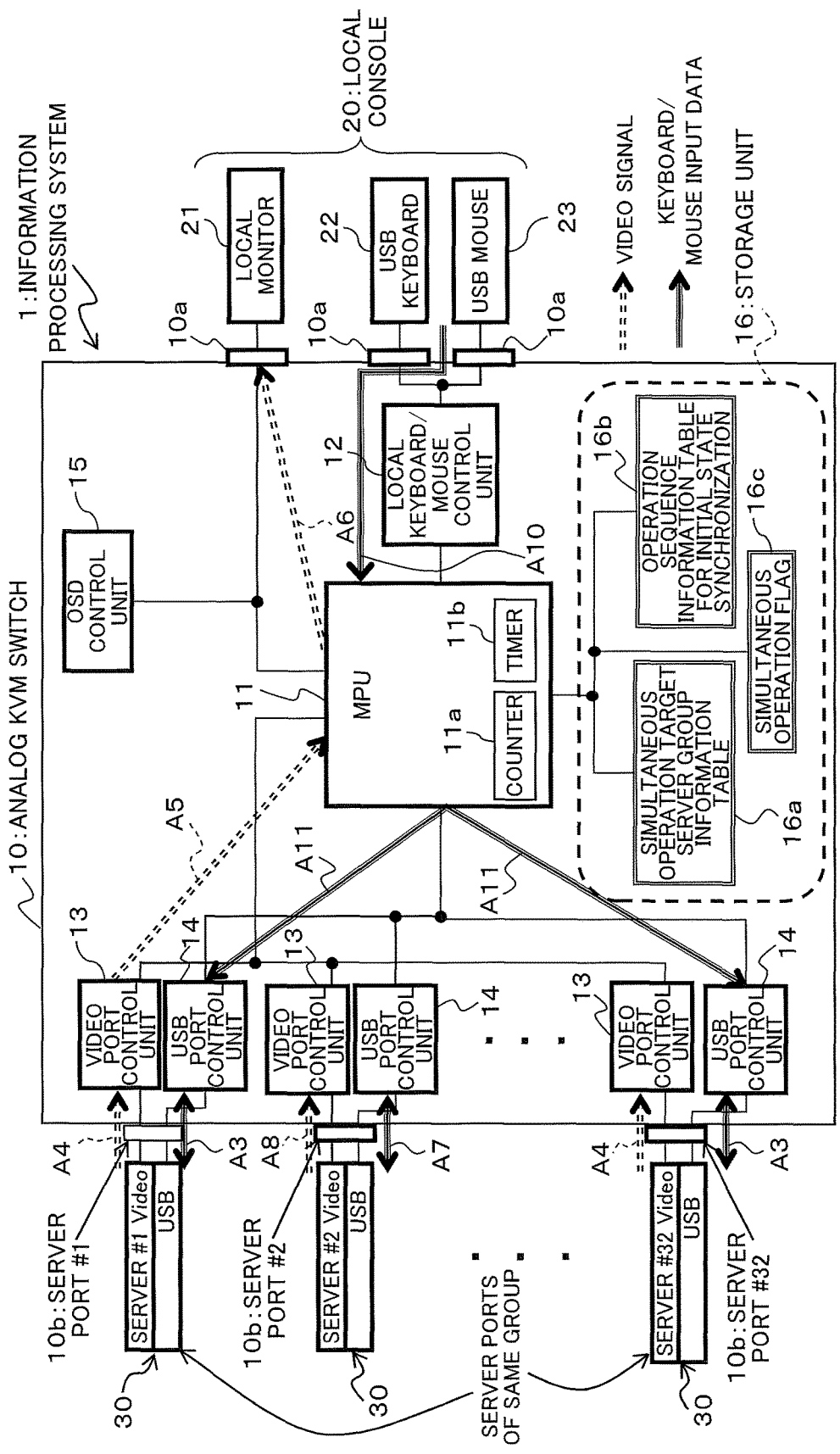
FIG. 13 is a diagram that illustrates an example of the flow of data when a simultaneous operation process is performed in this embodiment.

An example of the flow of data at the time of performing the simultaneous operation process in Step S58 is illustrated in FIG. 13. In the example illustrated in FIG. 13, server port #1 to which server #1 is connected is selected by the MPU 11. In addition, two servers #1 and #32 (server ports #1 and #32) belong to the same group. At this time, when input data input from the local console 20 is received by the MPU 11 through the local keyboard/mouse control unit 12 (see arrow A10), the MPU 11 simultaneously transmits the input data to the USB port control units 14 of the server ports #1 and #32 of the same group (see arrow A11). Then, the input data is respectively transmitted from server ports #1 and #32 to servers #1 and #32 (see arrow A3). When a video signal is received from server #1, the video port control unit 13 of the selected server port #1 transmits the received video signal to the local monitor 21 through the MPU 11 so as to be displayed (see arrows A4 to A6).

In addition, a video signal received from server #32 by the video port control unit 13 of server port #32 which belongs to the same group as that of server port #1 but has not been selected is the same as the video signal received from server #1 but is not used here.

In addition, in the server ports 10*b* (server ports #2 to #31 illustrated in FIG. 13) that do not belong to the above-described same group, as denoted by arrows A7 and A8 illustrated in FIG. 13, the emulation of the local port 10*a* is performed by the video port control unit 13 and the USB port control unit 14.

On the other hand, in a case where "-" is set (Yes route of Step S53) or in a case where the group ID is not set in the simultaneous operation flag 16*c* (No route of Step S54), the selected server port 10*b* operates independently without belonging to any group. Accordingly, in Step S56, the MPU 11 transmits the input data to the corresponding server 30 through the USB port control unit 14 of the selected server port 10*b*. Thereafter, the MPU 11 transits to the normal process in Step S58.

[3] Advantages of Information Processing System and Analog KVM Switch According to this Embodiment As above, according to the information processing system 1 and the analog KVM switch 10 of this embodiment, a plurality of the servers 30 connected to the analog KVM switch 10 are grouped. Then, after power is input to the servers 30, by transmitting operation data (the content of an operation) to the servers 30 of the same group in accordance with the operation sequence information registered for each group, the initial states of the servers 30 are synchronized in units of groups. After such a synchronization process of initial states is performed, when one server group is selected, input data input from the local console 20 is simultaneously transmitted to all of the plurality of the servers 30 belonging to the same group, whereby a plurality of servers 30 are simultaneously operated.

In other words, the simultaneous operation target servers 30 belonging to the same group have the same initial state by the synchronization process of initial states. Accordingly, by simultaneously transmitting the input data input from the local console 20 to the simultaneous operation target servers 30, the same operation results (the same screens) can be acquired from the simultaneous operation target server 30. Accordingly, the operator operates the keyboard 22 or the mouse 23 in a state in which an operation result transmitted from one server 30 among the simultaneous operation target servers 30 is selected and is displayed on the local monitor 21 as the selected server screen, whereby the same result (screen) can be acquired from all the simultaneous operation target servers 30.

In this embodiment, as described above, a plurality of the servers 30 that are grouped can be simultaneously operated, and, by simultaneously operating the plurality of servers 30 through one local console 20, the operation time can be markedly shortened, and the operation amount can be markedly reduced. Particularly, in a case where the same operation is simultaneously performed for extremely many servers 30 having the same configuration in a data center or the like, the operation time and the amount of the operation can be shortened or reduced to be about "1/the number of the simultaneous operation targets".

In addition, according to this embodiment, after the simultaneous operation is started, switching between the servers 30 (the server ports 10b) belonging to a group that is in the simultaneous operation and servers 30 (server ports 10b) belonging to a group other than the group can be freely made, and each server 30 can be operated. When a server port number belonging to the group that is in the simultaneous operation is selected, the input data input from the local console 20 is transmitted to all the servers 30 belonging to the simultaneous operation target server group (see Step S55 illustrated in FIG. 12). On the other hand, in a case where a server port number which belongs to a group that is not in the simultaneous operation or does not belong to the simultaneous operation target server group is selected, the input data input from the local console 20 is transmitted only to the selected server port 10b (the server 30) (see Step S56 illustrated in FIG. 12).

In addition, in this embodiment, the synchronization process of initial states is performed such that the simultaneous operation target servers 30 belonging to the same group are in the state in which a BIOS setting screen (setup menu) is displayed on the displays at the time of inputting power to the servers 30. Accordingly, the OS does not need to be started up in each server 30, and the synchronization process of initial states can be performed in a short time.

[4] Modified Example

While the MPU (synchronization control unit) 11 according to the above-described embodiment performs the synchronization process of initial states by transmitting the content of an operation to the servers 30 of the same group in accordance with the operation sequence information registered for each group, the present invention is not limited thereto. The MPU (the synchronization control unit) 11 according to an embodiment may perform the synchronization process of initial states by waiting for a state in which the servers 30 are in a predetermined steady state after the input of power (after starting) so as to be naturally synchronized with each other. In such a case, an example of the predetermined steady state includes a state in which each server 30 displays a login screen of the OS or a predetermined screen after the login to the OS.

Figure 14:
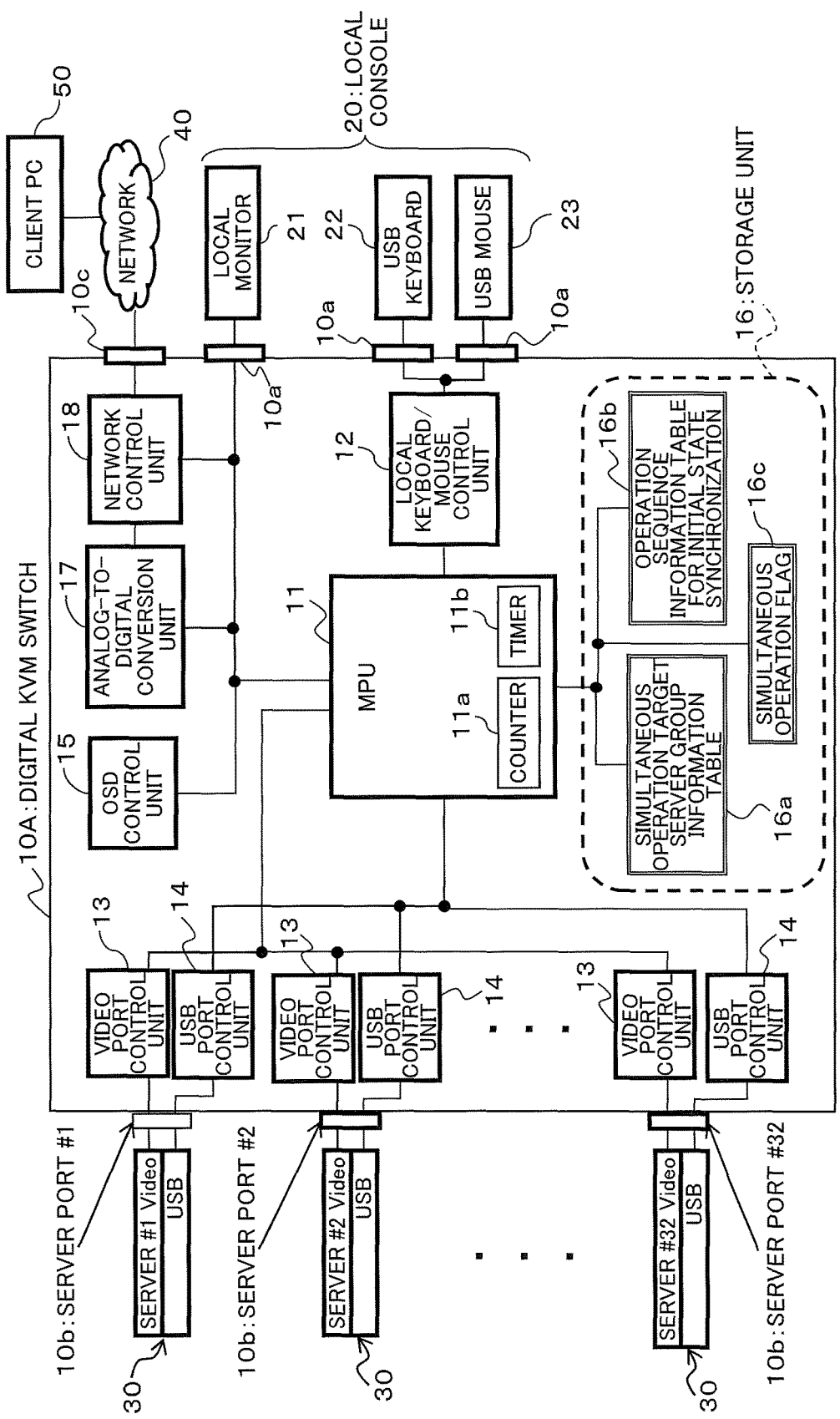
FIG. 14 is a block diagram that illustrates the hardware configuration and the functional configuration of the digital KVM switch (management apparatus) as a modified example of this embodiment.
Figure 15:
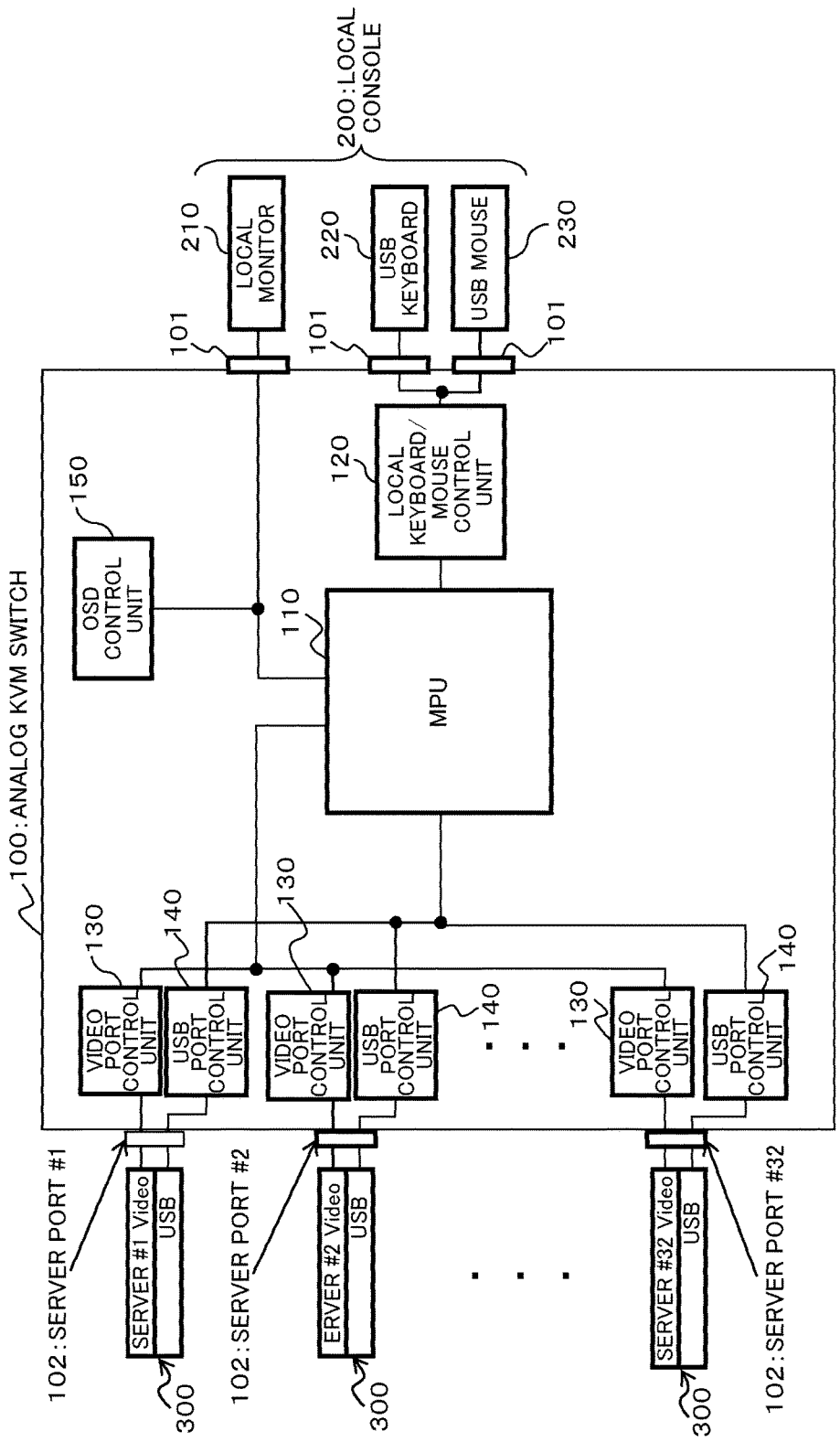
FIG. 15 is a block diagram that illustrates a general configuration example of an analog KVM switch capable of performing USB emulation.
Figure 16:
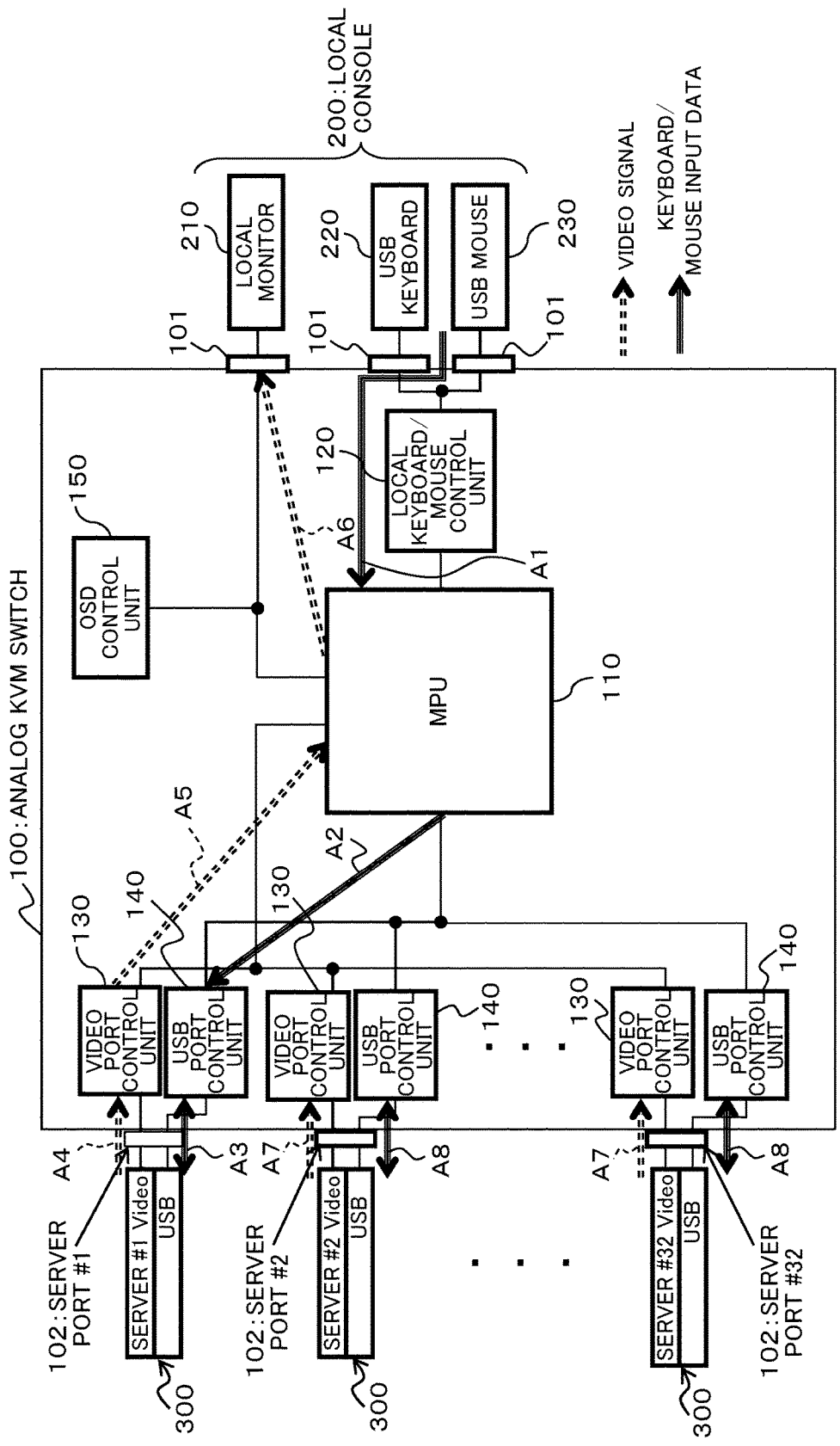
FIG. 16 is a diagram that illustrates the flow of a video signal and input data at the normal time of the analog KVM switch illustrated in FIG. 15.
Figure 17:
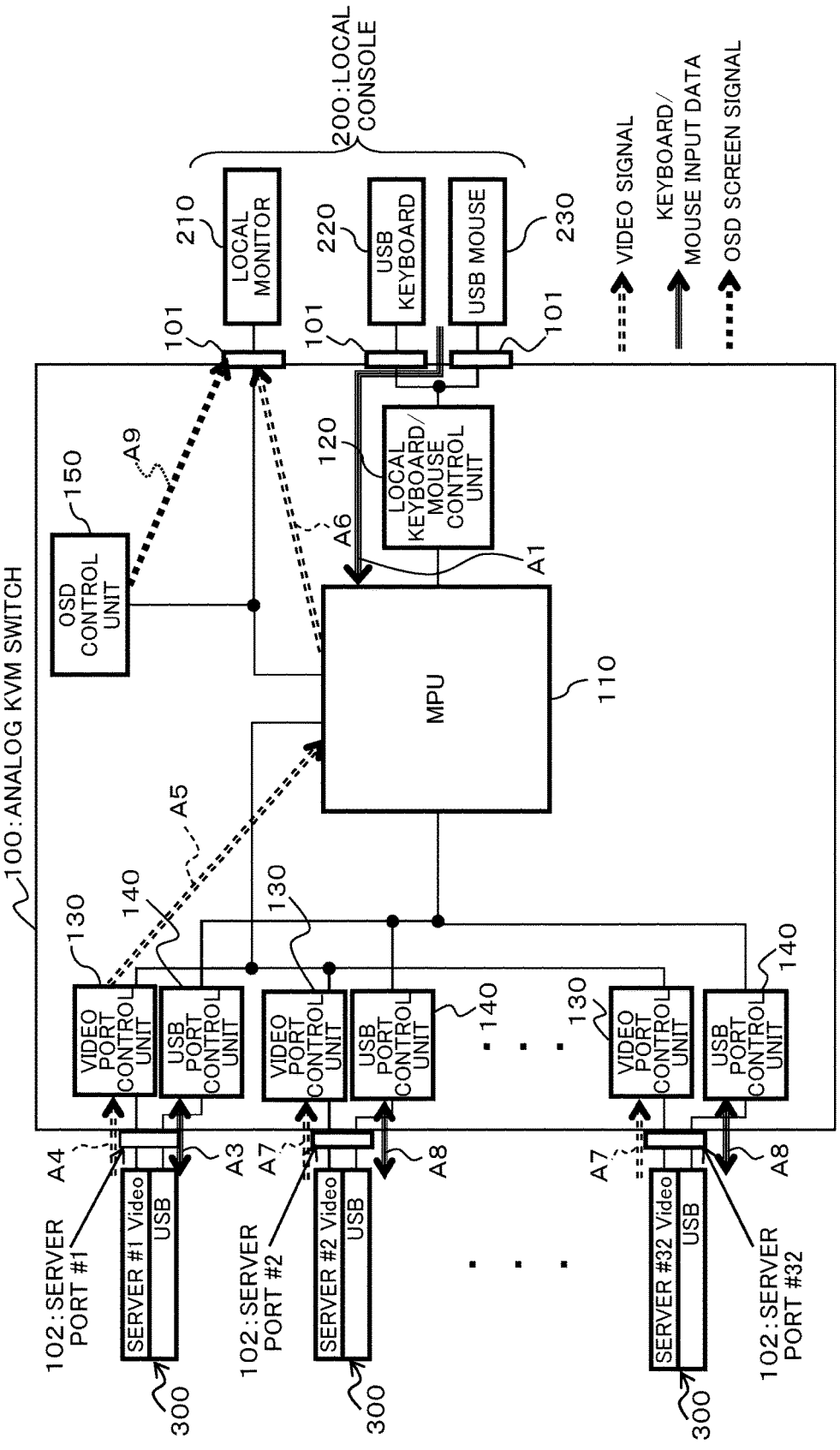
FIG. 17 is a diagram that illustrates the flow of a video signal and input data when the analog KVM switch illustrated in FIG. 15 transits to the OSD mode.

In addition, while the analog KVM switch 10 has been described in the above-described embodiment, the present invention, as illustrated in FIG. 14, may be similarly applied to the digital KVM switch 10A as well, whereby operations and advantages similar to those of the above-described embodiment can be acquired. FIG. 14 is a block diagram that illustrates the hardware configuration and the functional configuration of the digital KVM switch (management apparatus) 10A as a modified example of this embodiment.

While the digital KVM switch 10A has almost the same configuration as that of the analog KVM switch 10, in the digital KVM switch 10A, in addition to the configuration of the analog KVM switch 10, a network port 10c, an analog/digital conversion unit 17, and a network control unit 18 are provided. The digital KVM switch 10A is connected to a client PC 50 as a remote console through the analog/digital conversion unit 17, the network control unit 18, a network port 10c, and a network 40. The client PC 50 serves as a remote terminal and includes a keyboard and a mouse as input units and a monitor as an output unit.

The analog/digital conversion unit 17 converts analog signals transmitted from the MPU 11 and the OSD control unit 15 into digital signals and converts a digital signal transmitted from the network control unit 18 into an analog signal. The network control unit 18 is connected to the network 40 such as the Internet or a local area network (LAN) through the network port 10c and controls communication with the client PC 50 through the network 40.

According to the configuration as described above, the digital KVM switch 10A can simultaneously operate a plurality of servers 30 through the client PC 50 that is a remote terminal instead of the local console 20, and operations and advantages that are similar to those of the above-described embodiment can be acquired.

[5] Others

While the preferred embodiment of the present invention has been described in detail, the present invention is not limited to the embodiment described above, but various changes and modifications can be made therein in a range not departing from the concept of the present invention.

In addition, in this embodiment, while the initial state of each server 30 is configured to be a state in which the BIOS setting screen is displayed, the present invention is not limited thereto. Thus, the initial state may be any normal state that each server 30 reaches through a key operation or a mouse operation.

Furthermore, in this embodiment, while operation sequence information different for each server group is set, and each server 30 is set to an initial state different for each server group, it may be configured such that only one kind of operation sequence information is set, and all the servers 30 are set to the same initial state.

In addition, in this embodiment, while the KVM switches 10 and 10A have been described to respectively include 32 servers 30 and 32 server ports 10b, the present invention is not limited thereto.

All or some of the various functions of the KVM switches (management apparatuses) 10 and 10A according to this embodiment including the functions of the synchronization control unit (operation result transmitting unit) 11, the operation information reception unit 12, the operation result reception unit 13, the operation information transmitting unit 14, the OSD control unit 15, the analog/digital conversion unit 17, and the network control unit 18 described above are realized by executing a predetermined program using a computer (including a central processing unit (CPU), an information processing apparatus, and various terminals).

The program is provided in a form being recorded in a computer-readable recording medium such as a flexible disk, a CD (a CD-ROM, a CD-R, a CD-RW, or the like), a DVD (a DVD-ROM, a DVD-RAM, a DVD-R, a DVD-RW, a DVD+R, a DVD+RW, or the like), or a Blue-ray disc. In such a case, the computer reads the program from the recording medium and transmits the program to an internal storage device or an external storage device so as to be stored therein and used.

According to an embodiment, a plurality of grouped information processing apparatuses can be simultaneously operated.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present invention has (have) been described in detail, it should be understood that the various changes, substitutions, and alterations could be made hereto without departing from the spirit and scope of the invention.

What is claimed is:

1. An information processing system comprising:
   a console including an input unit and an output unit;
   a plurality of information processing apparatuses grouped into a plurality of mutually-different groups; and
   a management apparatus configured to be interposed between the console and the plurality of information processing apparatuses and manage the plurality of information processing apparatuses;
   wherein the management apparatus comprises:
   a memory; and
   a processor coupled to the memory and the processor configured to:
   receive operation information input from the input unit for information processing apparatuses belonging to a same group among the plurality of the information processing apparatuses;
   transmit the operation information received to the information processing apparatuses belonging to the same group;
   synchronize operations of the information processing apparatuses belonging to the same group by operating the information processing apparatuses belonging to the same group to be in a same state and then transmit the operation information to the information processing apparatus belonging to the same group simultaneously; and
   cause the output unit to output operation results according to the operation information, the operation results being received from the synchronized information processing apparatuses belonging to the same group.

2. The information processing system according to claim 1, wherein the processor is further configured to:
   receive the operation results from the synchronized information processing apparatuses belonging to the same group; and
   transmit the operation results received to the output unit.

3. The information processing system according to claim 1, wherein the processor is further configured to allow the information processing apparatuses belonging to the same group to be in the same state by operating the information processing apparatuses after starting, which belong to the same group, based on same operation sequence information.

4. The information processing system according to claim 3, wherein the management apparatus maintains an operation sequence information table in which the operation sequence information is registered in advance for each of the groups, and
   wherein the processor is further configured to allow the information processing apparatuses belonging to the same group to be in the same state by referring to the operation sequence information table for the same group and operating the information processing apparatuses after starting, which belong to the same group, based on the operation sequence information that is referred to.

5. The information processing system according to claim 4, wherein, in the operation sequence information table, the operation sequence information includes a standby time elapsing since a last operation is performed and a content of an operation that is to be performed at a time point when the standby time elapses.

6. The information processing system according to claim 4, wherein the management apparatus includes an on-screen display (OSD) control unit configured to cause the output unit to output, in an OSD mode, an operation sequence information setting screen for setting the operation sequence information table, and
   wherein the operation sequence information table is set for each of the groups through the operation sequence information setting screen.

7. The information processing system according to claim 3, wherein the same state is a state where a basic input/output system (BIOS) setting screen is being displayed.

8. The information processing system according to claim 1, wherein the processor is further configured to allow the information processing apparatuses belonging to the same group to be in the same state by waiting for the information processing apparatuses after starting, which belong to the same group, to be in a predetermined steady state.

9. The information processing system according to claim 8, wherein the predetermined steady state is a state where a login screen of an operating system (OS) or a predetermined screen after login to the OS is being displayed.

10. The information processing system according to claim 1, wherein, in a case where there is an information processing apparatus that does not reach the same state among the information processing apparatuses belonging to the same group, the processor is further configured to cause the output unit to output an error notification for the information processing apparatus.

11. The information processing system according to claim 1,
    wherein the management apparatus maintains a group information table in which information relating to the information processing apparatuses belonging to the same group is registered in advance, and
    wherein the processor is further configured to refer to the information in the group information table and specifies the information processing apparatuses belonging to the same group based on the information that is referred to.

12. The information processing system according to claim 11,
    wherein the management apparatus includes an on-screen display (OSD) control unit configured to cause the output unit to output, in an OSD mode, a group information setting screen for setting the group information table, and wherein the group information table is set through the group information setting screen.

13. A management apparatus that is interposed between a console, including an input unit and an output unit, and a plurality of information processing apparatuses grouped into a plurality of mutually-different groups and manages the plurality of information processing apparatuses, the management apparatus comprising:
a memory; and
a processor coupled to the memory and the processor configured to:
receive operation information input from the input unit for information processing apparatuses belonging to a same group among the plurality of the information processing apparatuses;
transmit the operation information received to the information processing apparatuses belonging to the same group;
synchronize operations of the information processing apparatuses belonging to the same group by operating the information processing apparatuses belonging to the same group to be in a same state and then transmit the operation information to the information processing apparatus belonging to the same group simultaneously; and
cause the output unit to output operation results according to the operation information, the operation results being received from the synchronized information processing apparatuses belonging to the same group.

14. The management apparatus according to claim 13, wherein the processor is further configured to allow the information processing apparatuses belonging to the same group to be in the same state by operating the information processing apparatuses after starting, which belong to the same group, based on same operation sequence information.

15. The management apparatus according to claim 14, wherein an operation sequence information table in which the operation sequence information is registered in advance is maintained for each of the groups, and wherein the processor is further configured to allow the information processing apparatuses belonging to the same group to be in the same state by referring to the operation sequence information table for the same group and operating the information processing apparatuses after starting, which belong to the same group, based on the operation sequence information that is referred to.

16. The management apparatus according to claim 15, wherein, in the operation sequence information table, the operation sequence information includes a standby time elapsing since a last operation is performed and a content of an operation that is to be performed at a time point when the standby time elapses.

17. The management apparatus according to claim 13, wherein the processor is further configured to allow the information processing apparatuses belonging to the same group to be in the same state by waiting for the information processing apparatuses after starting, which belong to the same group, to be in a predetermined steady state.

18. A management method intervening between a console, including an input unit and an output unit, and a plurality of information processing apparatuses grouped into a plurality of mutually-different groups and managing the plurality of information processing apparatuses, the management method comprising:
synchronizing operations of information processing apparatuses belonging to a same group among the plurality of information processing apparatuses by operating the information processing apparatuses belonging to the same group to be in a same state and then transmitting operation information received from the input unit to the information processing apparatus belonging to the same group simultaneously; and
causing the output unit to output operation results according to the operation information that are received from the synchronized information processing apparatuses belonging to the same group.

* * * * *